United States Patent
Tsubone et al.

(10) Patent No.: US 12,247,643 B2
(45) Date of Patent: Mar. 11, 2025

(54) ROTARY DRIVE DEVICE

(71) Applicants: Nidec-Shimpo Corporation, Nagaokakyo (JP); Honda Motor Co., Ltd., Tokyo (JP)

(72) Inventors: Taihei Tsubone, Nagaokakyo (JP); Kyohei Haizumi, Nagaokakyo (JP); Kazuki Mori, Nagaokakyo (JP); Wataru Yada, Tokyo (JP)

(73) Assignees: NIDEC-SHIMPO CORPORATION, Kyoto (JP); HONDA MOTOR CO., LTD., Tokyo (JP)

( * ) Notice: Subject to any disclaimer, the term of this patent is extended or adjusted under 35 U.S.C. 154(b) by 897 days.

(21) Appl. No.: 17/217,649

(22) Filed: Mar. 30, 2021

(65) Prior Publication Data
US 2021/0301904 A1    Sep. 30, 2021

(30) Foreign Application Priority Data

Mar. 31, 2020   (JP) ................... 2020-064168

(51) Int. Cl.
| | |
|---|---|
| *F16H 1/32* | (2006.01) |
| *B60B 19/12* | (2006.01) |
| *B60K 7/00* | (2006.01) |
| *B60K 17/04* | (2006.01) |
| *B62K 1/00* | (2006.01) |

(52) U.S. Cl.
CPC ............. *F16H 1/32* (2013.01); *B60B 19/125* (2013.01); *B60K 7/0007* (2013.01); *B60K 17/043* (2013.01); *B62K 1/00* (2013.01); *B60K 2007/003* (2013.01); *B60K 2007/0092* (2013.01)

(58) Field of Classification Search
CPC . F16H 1/24; F16H 1/32; B60B 19/125; B60B 19/003; B60K 7/0007; B60K 17/043; B60K 2007/003; B60K 2007/0092; B60K 17/046; B60K 2007/0038; B62K 1/00; B60Y 2200/62; B60Y 2200/66; B62D 63/02
USPC .............................................. 180/7.1; 701/23
See application file for complete search history.

(56) References Cited

FOREIGN PATENT DOCUMENTS

| | | | |
|---|---|---|---|
| JP | 06-247158 A | 9/1994 | |
| JP | 2011063209 A | * 3/2011 | ........... B60B 19/003 |

* cited by examiner

*Primary Examiner* — Kevin Hurley
*Assistant Examiner* — Felicia L. Brittman-Alabi
(74) *Attorney, Agent, or Firm* — Keating & Bennett, LLP

(57) ABSTRACT

A rotary drive device includes a pair of drive force transmissions, a pair of decelerators, a pair of carriers, and at least one coupler. Driving rollers are included in the pair of drive force transmissions. Driving rollers transmit drive force to a main wheel. The main wheel includes driven rollers. The pair of drive force transmissions are rotatable about a rotation axis. The pair of carriers accommodate at least a portion of the decelerators. The pair of carriers oppose each other in an axial direction along the rotation axis. The pair of carriers include a first carrier and a second carrier that are directly or indirectly coupled by the at least one coupler.

12 Claims, 19 Drawing Sheets

ROTARY DRIVE DEVICE

CROSS REFERENCE TO RELATED APPLICATION

The present application claims priority under 35 U.S.C. § 119 to Japanese Patent Application No. 2020-064168, filed on Mar. 31, 2020, the entire contents of which are hereby incorporated herein by reference.

1. FIELD OF THE INVENTION

The present invention relates to a rotary drive device.

2. BACKGROUND

A conventional friction type drive device is included as a travel unit in an inverted pendulum type mobile body. The inverted pendulum type mobile body has a lower frame and an upper frame coupled to each other. The friction type drive device is supported by the lower frame of the inverted pendulum type mobile body. The lower frame has a left side wall portion and a right side wall portion facing each other at an interval in a left-right direction.

The friction type drive device has left and right cylindrical mount members. The friction type drive device is arranged between the left side wall portion and the right side wall portion of the lower frame. The left and right mount members are fixedly mounted to the inside of the left side wall portion and the right side wall portion by attachment bolts, respectively. That is, the left and right mount members are fixed to the lower frame concentrically with each other about the center axis.

The left and right mount members rotatably support left and right circular drive disks by cross roller bearings on the outer circumference of the cylindrical portion of the mount member. Each of the left and right drive disks has an outer circular portion having a diameter larger than that of the cylindrical portion of the drive disk. Left and right drive rollers are rotatably attached to the outer circular portion by a roller shaft.

Left and right electric motors are arranged inside the cylindrical portions of the left and right drive disks. The output rotation of the left and right electric motors is decelerated by left and right planetary gear devices and is transmitted individually to the left and right drive disks. The left and right planetary gear devices are fixed to rotor shafts of the left and right electric motors with a sun gear as an input member, are fixed to the left and right drive disks with a ring gear as an output member, and are fixed to the mount member with a pinion carrier as a reaction member, thereby providing a reduction gear.

However, it is not possible for the conventional friction type drive device to easily couple a pair of carriers.

SUMMARY

An example embodiment of a rotary drive device of the present disclosure includes a pair of drive force transmissions, a pair of decelerators, a pair of carriers, and at least one coupler. A plurality of driving rollers are in the pair of drive force transmissions. The plurality of driving rollers transmit drive force to a main wheel. The main wheel includes a plurality of driven rollers. The pair of drive force transmissions are rotatable about a rotation axis. The pair of decelerators decelerate a rotation speed of an input shaft, and rotate the drive force transmission at a decelerated rotation speed. The pair of carriers accommodate at least a portion of the decelerator. The pair of carriers oppose each other in an axial direction along the rotation axis. The pair of carriers includes a first carrier and a second carrier. The first carrier and the second carrier are directly or indirectly coupled by the at least one coupler.

The above and other elements, features, steps, characteristics and advantages of the present disclosure will become more apparent from the following detailed description of the example embodiments with reference to the attached drawings.

DETAILED DESCRIPTION

Figure 1:
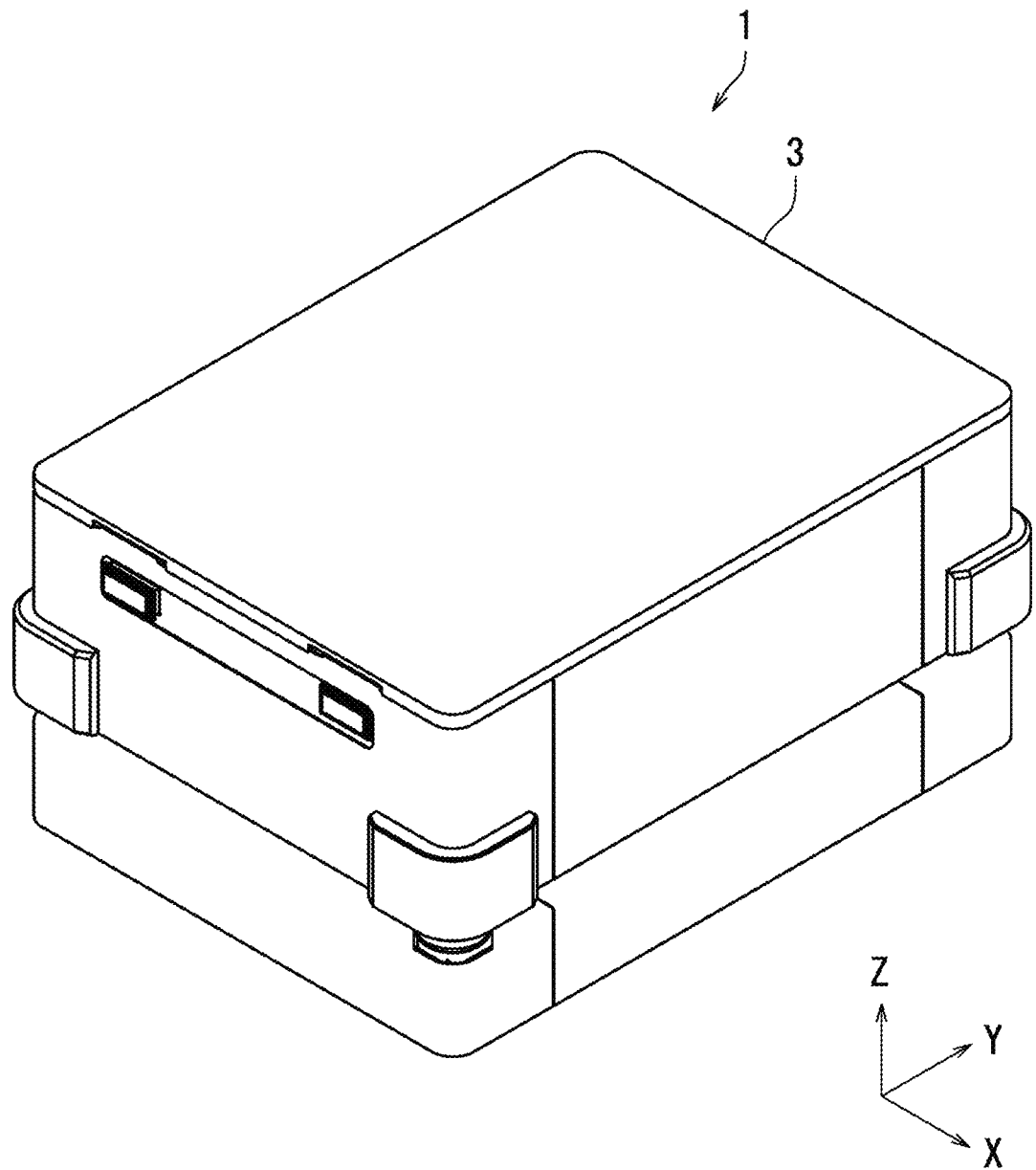
FIG. 1 is a perspective view showing a transport vehicle according to an example embodiment of the present disclosure.

Hereinafter, example embodiments of the present disclosure will be described with reference to the drawings. In the drawings, the same or corresponding parts are given the same reference numerals, and the description will not be repeated. In the drawings, the X, Y, and Z axes of the three-dimensional orthogonal coordinate system are described as appropriate for ease of understanding.

In this description, a direction parallel to a rotation axis AX (e.g., FIG. 3) of a rotary drive device is described as an "axial direction AD". That is, the direction along the rotation axis is described as the "axial direction AD". The direction orthogonal to the rotation axis AX is described as a "radial direction RD". The "radial direction RD" corresponds to an example of a "radial direction relative to the rotation axis". The direction along an arc about the rotation axis AX is described as a "circumferential direction CD". The "circumferential direction CD" corresponds to an example of a "circumferential direction around the rotation axis". Note that a "parallel direction" includes a substantially parallel direction, and an "orthogonal direction" includes a substantially orthogonal direction. Further, "left and right" indicates left and right when the object is viewed from the radial direction RD.

With reference to FIGS. 1 to 19, a transport vehicle 1, a rotary drive device DV, a first drive force transmission device 11A, a second drive force transmission device 11B, a drive force transmission 110A, and a second drive force transmission 110B according to an example embodiment of the present disclosure will be described. First, the transport vehicle 1 will be described with reference to FIGS. 1 to 3.

Figure 2:
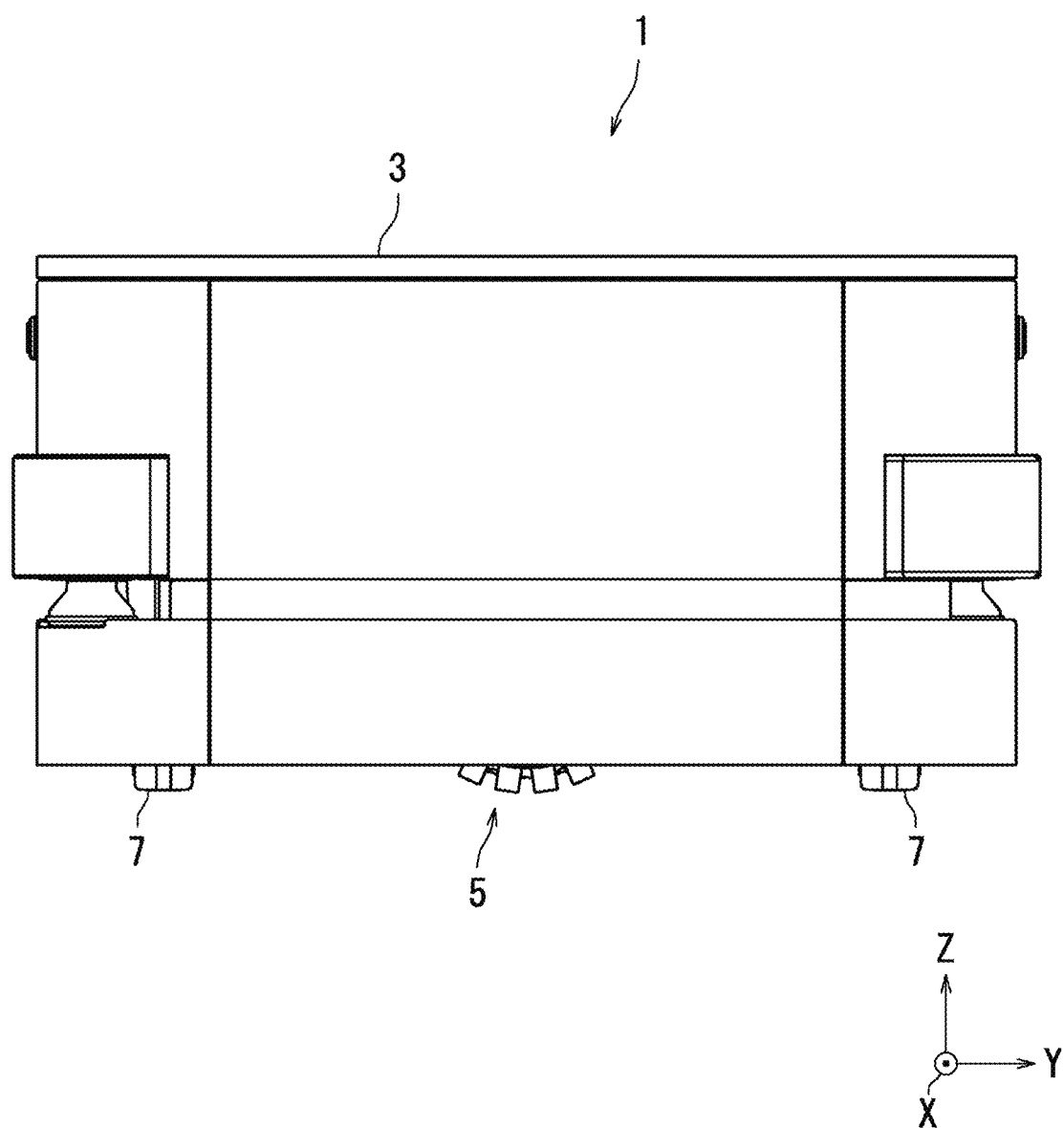
FIG. 2 is a side view showing a transport vehicle according to an example embodiment of the present disclosure.
Figure 3:
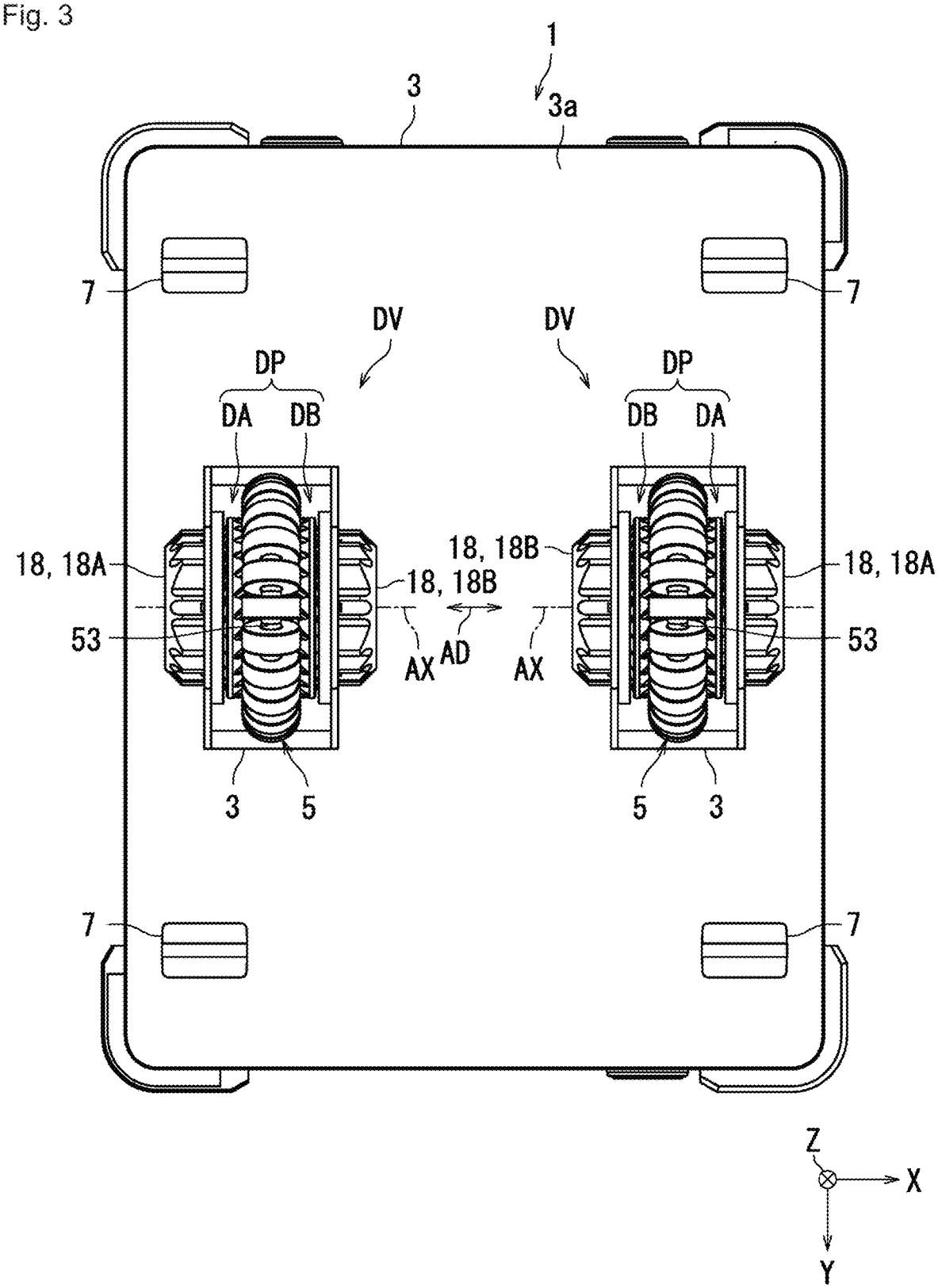
FIG. 3 is a bottom view showing a transport vehicle according to an example embodiment of the present disclosure.

FIG. 1 is a perspective view showing the transport vehicle 1. FIG. 2 is a side view showing the transport vehicle 1. FIG. 3 is a bottom view showing the transport vehicle 1. In FIG. 3, the transport vehicle 1 is viewed from the floor surface or the ground surface side.

The transport vehicle 1 shown in FIGS. 1 and 2 travels on the floor surface or the ground surface. In the present example embodiment, the transport vehicle 1 is an automated guided vehicle (AGV). The transport vehicle 1 is an example of a "mobile body".

As shown in FIG. 1, the transport vehicle 1 has a vehicle body 3. In the examples of FIGS. 1 and 2, the vehicle body 3 has a substantially rectangular parallelepiped shape. However, the shape of the vehicle body 3 is not particularly limited.

As shown in FIGS. 2 and 3, the transport vehicle 1 further has a plurality of the rotary drive devices DV and a plurality of wheels 7. In the present example embodiment, the transport vehicle 1 has a pair of rotary drive devices DV and four wheels 7. The four wheels 7 are respectively arranged at four corners of a bottom portion 3a of the vehicle body 3. Each wheel 7 rotates with the movement of the vehicle body 3. The pair of rotary drive devices DV rotate independently of each other to move the vehicle body 3. The pair of rotary drive devices DV are arranged at the bottom portion 3a of the vehicle body 3 so that the rotation axis AX of one of the pair of rotary drive devices DV and the rotation axis AX of the other rotary drive device DV are positioned on a straight line.

The pair of rotary drive devices DV have the same configuration. Therefore, one of the pair of rotary drive devices DV will be described below.

As shown in FIG. 3, the rotary drive device DV includes a main wheel 5, a first drive assembly DA, and a second drive assembly DB. The first drive assembly DA and the second drive assembly DB drive the main wheel 5. As a result, the main wheel 5 rotates about the rotation axis AX. Therefore, the rotation axis AX is also the rotation axis of the main wheel 5. The first drive assembly DA comes into contact with the main wheel 5 from one side of the main wheel 5 in the axial direction AD to drive the main wheel 5. The second drive assembly DB comes into contact with the main wheel 5 from the other side of the main wheel 5 in the axial direction AD to drive the main wheel 5.

The first drive assembly DA has the first drive force transmission device 11A, a first motor 17A, and a first motor case 18A. The first motor 17A has a first rotary shaft 171A.

The second drive assembly DB has the second drive force transmission device 11B, a second motor 17B, and a second motor case 18B. The second motor 17B has a second rotary shaft 171B. The configuration of the second motor 17B is the same as the configuration of the first motor 17A of the first drive assembly DA, and the description thereof will be omitted. The second drive force transmission device 11B has a structure in which the first drive force transmission device 11A of the first drive assembly DA is inverted to the left and right, and the description thereof will be omitted as appropriate.

Figure 4:
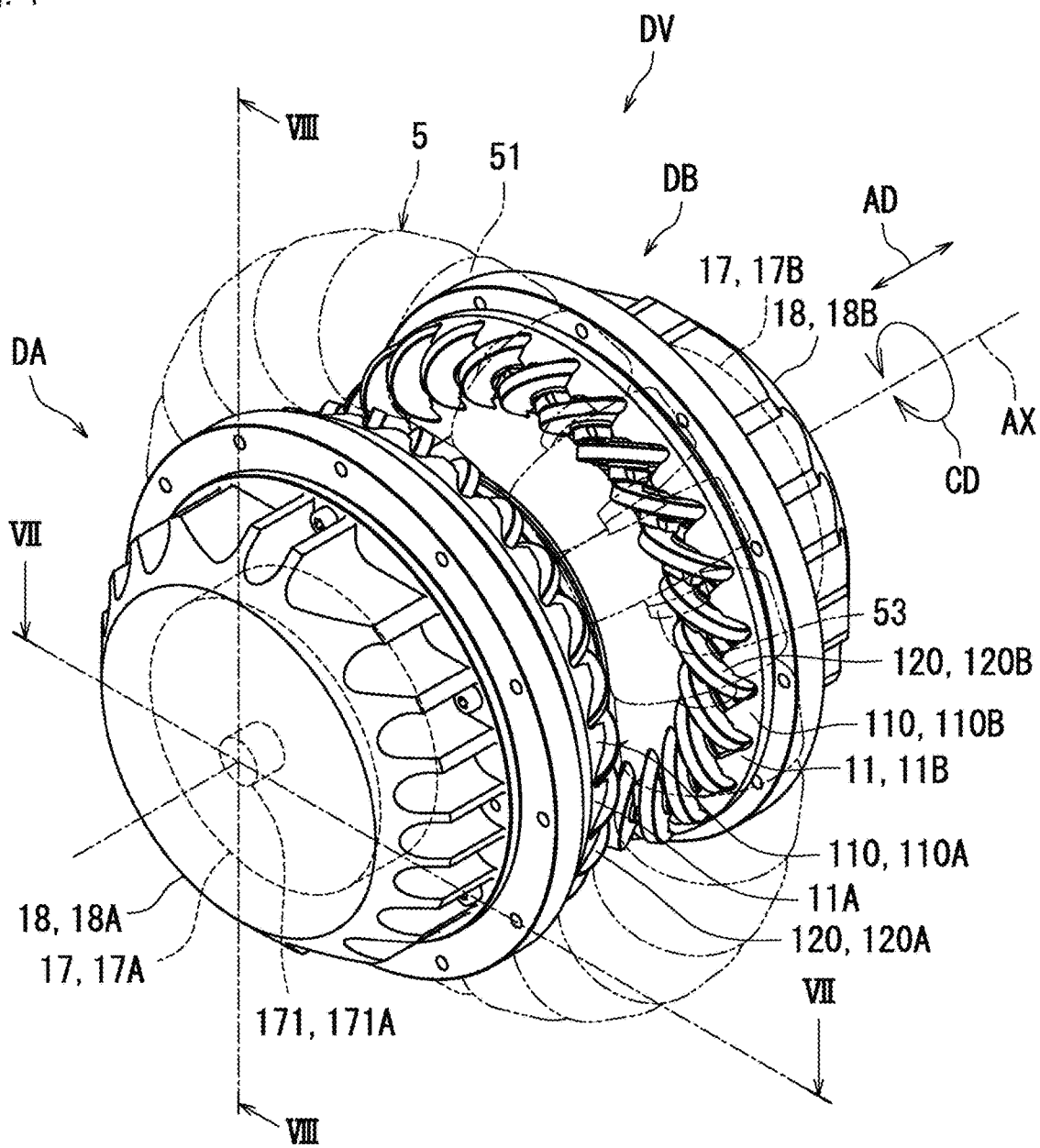
FIG. 4 is a perspective view showing a rotary drive device according to an example embodiment of the present disclosure.

Next, the rotary drive device DV will be described with reference to FIG. 4. FIG. 4 is a perspective view showing the rotary drive device DV. As shown in FIG. 4, in the rotary drive device DV, the first drive force transmission device 11A of the first drive assembly DA has a substantially disk-like shape. The first drive force transmission device 11A is arranged on one side of the main wheel 5 in the axial direction AD. The first drive force transmission device 11A is rotatably supported. The first drive force transmission device 11A is driven by the first motor 17A to rotate about the rotation axis AX. Therefore, the rotation axis AX is also the rotation axis of the first drive force transmission device 11A. Then, the first drive force transmission device 11A comes into contact with the main wheel 5 from one side of the main wheel 5 in the axial direction AD to drive the main wheel 5.

The first drive force transmission device 11A rotates about the rotation axis AX. As a result, the first drive force transmission device 11A transmits the drive force based on the rotational force to the main wheel 5. That is, the first drive force transmission device 11A transmits the drive force of the first motor 17A to the main wheel 5.

The second drive force transmission device 11B of the second drive assembly DB has a substantially disk-like shape. The second drive force transmission device 11B is arranged on the other side of the main wheel 5 in the axial direction AD. The second drive force transmission device 11B is rotatably supported. The second drive force transmission device 11B is driven by the second motor 17B to rotate about the rotation axis AX. Therefore, the rotation axis AX is also the rotation axis of the second drive force transmission device 11B. Then, the second drive force transmission device 11B comes into contact with the main wheel 5 from the other side of the main wheel 5 in the axial direction AD to drive the main wheel 5.

The first drive force transmission device 11A and the second drive force transmission device 11B hold the main wheel 5 from the axial direction AD. The first drive force transmission device 11A and the second drive force transmission device 11B are arranged symmetrically across the main wheel 5. Furthermore, the first drive force transmission device 11A and the second drive force transmission device 11B rotatably support the main wheel 5 about the rotation axis AX.

The main wheel 5 has a plurality of driven rollers 51 and a core body 53. The core body 53 extends along the circumferential direction CD about the rotation axis AX. The core body 53 has a substantially circular shape. Each of the plurality of driven rollers 51 has a substantially cylindrical shape. The plurality of driven rollers 51 are rotatably supported by the core body 53. Specifically, each of the plurality of driven rollers 51 is rotatable about an axis along a tangential direction of the core body 53 at its own position. Hereinafter, rotation of the driven roller 51 about an axis along the tangential direction of the core body 53 at its own position may be described as "spinning". The plurality of driven rollers 51 are arranged on the core body 53 at intervals along the circumferential direction CD.

When the main wheel 5 rotates about the rotation axis AX, each of the plurality of driven rollers 51 is rotationally moved along the circumferential direction CD. Hereinafter, the position of the driven roller 51 in the circumferential direction CD when the driven roller 51 is rotationally moved along the circumferential direction CD may be described as a "rotational movement position". Each of the plurality of driven rollers 51 comes into contact with the floor surface or the ground surface in accordance with the rotational movement position of the driven roller 51. Hereinafter, the contact of the driven roller 51 with the floor surface or the ground surface may be described as "grounding". A roller body of the driven roller 51 is made of rubber, for example.

Next, the details of the first drive force transmission device 11A will be described with reference to FIGS. 4 and 5. As shown in FIG. 4, the rotary drive device DV has a pair of drive force transmissions 110. The pair of drive force transmissions 110 has the drive force transmission 110A and the drive force transmission 110B. More specifically, in the present example embodiment, the rotary drive device DV has the first drive assembly DA, the first drive assembly DA has the first drive force transmission device 11A, and the first drive force transmission device 11A has the drive force transmission 110. Similarly, in the present example embodiment, the rotary drive device DV has the second drive assembly DB, the second drive assembly DB has the second drive force transmission device 11B, and the second drive force transmission device 11B has the drive force transmission 110. Hereinafter, the "first drive force transmission 110A" and the "second drive force transmission 110B" may be collectively described simply as a "drive force transmission 110". The drive force transmission 110 has a substantially disk-like shape. The drive force transmission 110 is made of a highly rigid material such as, for example, metal and hard plastic.

The drive force transmission 110 is rotatable about the rotation axis AX. Specifically, when the first rotary shaft 171A of the first motor 17A rotates, the drive force transmission 110 rotates about the rotation axis AX. Therefore, the rotation axis AX is also the rotation axis of the drive force transmission 110.

Figure 5:
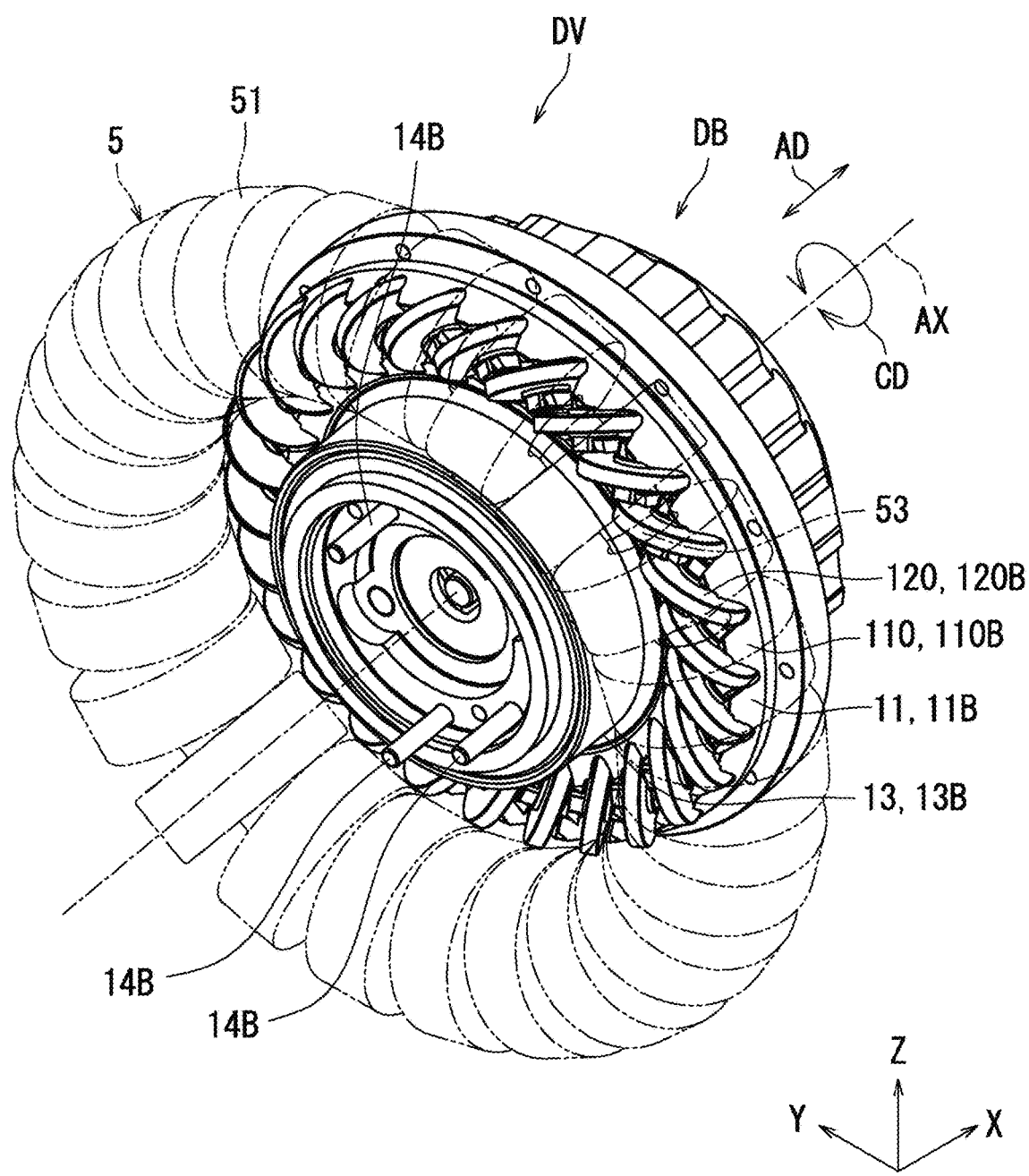
FIG. 5 is a perspective view showing a main wheel and a second drive assembly according to an example embodiment of the present disclosure.

FIG. 5 is a perspective view showing the main wheel 5 and the second drive assembly DB. In FIG. 5, the main wheel 5 and the second drive assembly DB are viewed from the side where the first drive assembly DA is arranged in FIG. 4. In FIG. 5, the first drive assembly DA is not illustrated for ease of understanding. Furthermore, in FIG. 5, the main wheel 5 is shown by a two-dot chain line in order to make the figure easier to see.

As shown in FIGS. 4 and 5, the first drive force transmission device 11A has a plurality of driving rollers 120. The plurality of driving rollers 120 are arranged in the drive force transmission 110. When the drive force transmission 110 rotates about the rotation axis AX, each of the plurality of driving rollers 120 is rotationally moved along the circumferential direction CD. Hereinafter, the position of the driving roller 120 in the circumferential direction CD when the driving roller 120 is rotationally moved along the circumferential direction CD may be described as a "rotational movement position".

Each of the plurality of driving rollers 120 comes into contact with any of the plurality of driven rollers 51 in accordance with the rotational movement position of the driving roller 120. Specifically, at least, the driving roller 120 comes into contact with the driven roller 51 positioned at the lowermost part and grounded. In this case, the outer circumferential surface of the driving roller 120 comes into contact with the outer circumferential surface of the driven roller 51. As a result, by the friction between the driving roller 120 and the driven roller 51, the drive force based on the rotation of the drive force transmission 110 is transmitted from the driving roller 120 to the driven roller 51. In other words, the plurality of driving rollers 120 transmit the drive force to the main wheel 5. Moreover, in other words, the plurality of driving rollers 120 transmit propulsion force to the main wheel 5.

Specifically, each of the plurality of driving rollers 120 is rotatably arranged around a center axis (hereinafter, described as a "center axis CT") extending in a direction that is neither orthogonal nor parallel to the rotation direction of the main wheel 5 about the rotation axis AX. That is, the center axis CT of the plurality of driving rollers 120 is inclined with respect to the rotation direction of the main wheel 5 about the rotation axis AX, and has a twisting relationship with respect to the rotation axis AX.

The rotary drive device DV further has a pair of carriers 13, a pair of deceleration assemblies, and at least one coupler.

In the present description, the carrier 13 of the first drive assembly DA may be described as a "first carrier 13A", and the carrier 13 of the second drive assembly DB may be described as a "second carrier 13B". The pair of carriers 13 has the first carrier 13A and the second carrier 13B.

The second drive assembly DB further has the second carrier 13B, at least one coupler 14B, and the deceleration assembly. In the present example embodiment, the second drive assembly DB has three couplers 14B. The coupler 14B is, for example, a bolt.

Similarly, the first drive assembly DA further has the first carrier 13A, at least one coupler 14A, and the deceleration assembly. In the present example embodiment, the first drive assembly DA has three couplers 14A.

The first carrier 13A and the second carrier 13B are coupled via at least one coupler 14A and at least one coupler 14B. Accordingly, the first drive assembly DA and the second drive assembly DB are coupled via at least one coupler 14A and at least one coupler 14B.

Subsequently, the control of the movement direction of the main wheel 5 will be described with reference to FIGS. 4 and 5. As shown in FIG. 4, the drive force transmission 110 of the first drive force transmission device 11A may be described as the "drive force transmission 110A", and the drive force transmission 110 of the second drive force transmission device 11B may be described as the "drive force transmission 110B".

As shown in FIG. 4, the first motor 17A and the second motor 17B independently control the rotation direction and the rotation speed of the drive force transmission 110A and the rotation direction and the rotation speed of the drive force transmission 110B, thereby controlling the movement direction of the main wheel 5.

Specifically, when the first motor 17A and the second motor 17B are driven in the same rotation direction at the same rotation speed, the drive force transmission 110A and the drive force transmission 110B rotate at the same rotation speed in the same rotation direction, and the main wheel 5 rotates about the rotation axis AX. In this case, no difference occurs in rotation speed between the drive force transmission 110A and the drive force transmission 110B, and hence the driven roller 51 of the main wheel 5 does not spin, and the main wheel 5 moves forward or backward straight.

On the other hand, when the first motor 17A and the second motor 17B are driven in different rotation directions and/or at different rotation speeds, a difference occurs in rotation speed between the drive force transmission 110A and the drive force transmission 110B.

In this case, a component force orthogonal to the circumferential force generated by the rotational force of the drive force transmission 110A acts on the contact surface between the driving roller 120 (FIG. 5) of the drive force transmission 110A and the driven roller 51 of the main wheel 5. In addition, a component force orthogonal to the circumferential force generated by the rotational force of the drive force transmission 110B acts on the contact surface between the driving roller 120 of the drive force transmission 110B and the driven roller 51 of the main wheel 5.

Therefore, the driven roller 51 spins without the main wheel 5 rotating about the rotation axis AX, or the driven roller 51 spins with the main wheel 5 rotating about the rotation axis AX. As a result, the main wheel 5 moves in the left-right direction or the oblique direction.

The first drive force transmission device 11A and the second drive force transmission device 11B support the main wheel 5 rotatably about the rotation axis AX by holding the main wheel 5 between the plurality of driving rollers 120 of the drive force transmission 110A and the plurality of driving rollers 120 of the drive force transmission 110B.

Figure 6A:
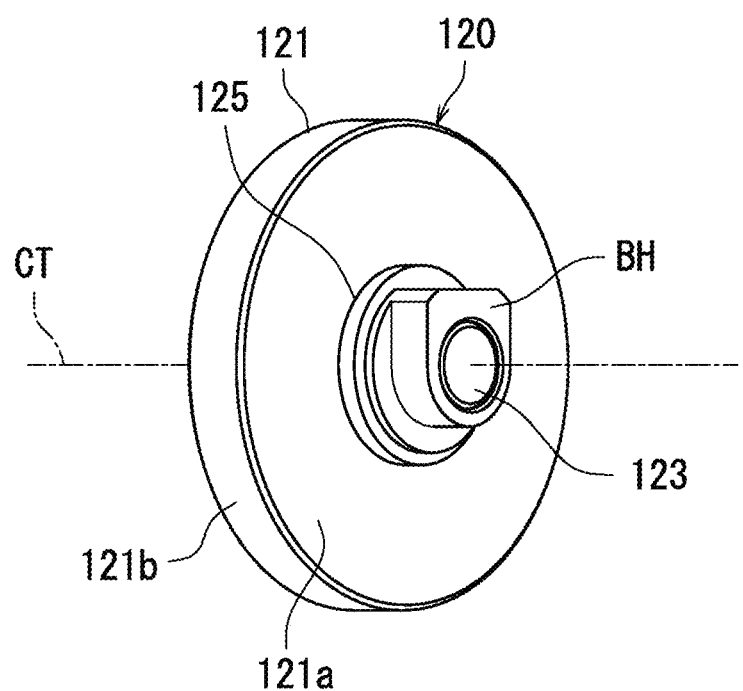
FIG. 6A is a perspective view showing a driving roller according to an example embodiment of the present disclosure.
Figure 6B:
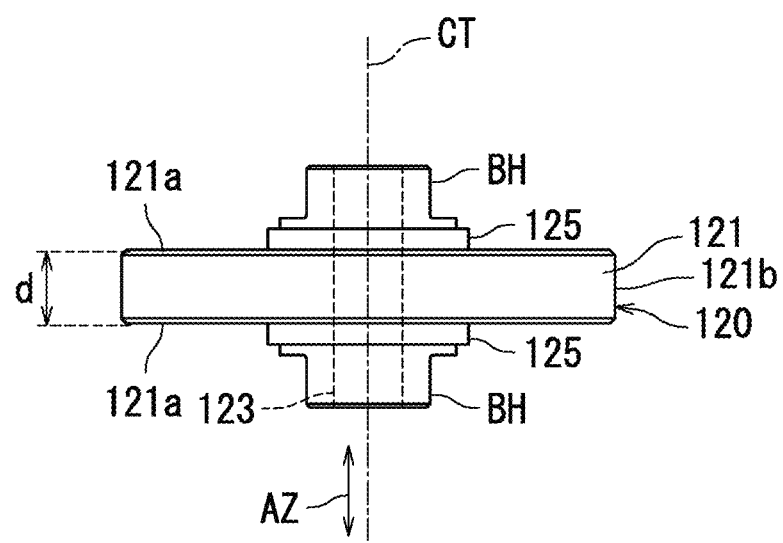
FIG. 6B is a top view showing the driving roller according to an example embodiment of the present disclosure.

Next, the driving roller 120 will be described with reference to FIGS. 6A and 6B. FIG. 6A is a perspective view showing the driving roller 120. FIG. 6B is a top view showing the driving roller 120. As shown in FIGS. 6A and 6B, the driving roller 120 has a roller body 121 and a shaft 123. The roller body 121 has a substantially disk-like shape. The roller body 121 is made of a highly rigid material such as, for example, metal and hard plastic. The shaft 123 is arranged on the center axis CT. That is, the axis 123 extends along the center axis CT. The shaft 123 has a substantially cylindrical shape. The shaft 123 penetrates the roller body 121 and is fixed to the roller body 121. The shaft 123 is made of a highly rigid material such as, for example, metal and hard plastic.

Here, the drive force transmission device 11 (FIG. 5) has, with respect to one driving roller 120, a pair of bushes BH and a pair of shims 125. Since the first drive force transmission device 11A has the plurality of driving rollers 120, the first drive force transmission device 11A has a plurality of bushes BH and a plurality of shims 125.

The pair of bushes BH rotatably support the driving roller 120 about the center axis CT. Specifically, one bush BH of the pair of bushes BH rotatably supports one end portion of the shaft 123, and the other bush BH rotatably supports the other end portion of the shaft 123. The bush BH is made of a highly rigid material such as, for example, metal and hard plastic.

Each of the pair of shims 125 is made of an elastic member such as rubber. Then, one shim 125 of the pair of shims 125 is held between one side surface 121a of the roller body 121 and the bush BH, and the other shim 125 is held between the other side surface 121a of the roller body 121 and the bush BH. As a result, it is possible to suppress generation of sound caused by the driving roller 120 when the drive force transmission 110 rotates about the rotation axis AX.

Figure 7:
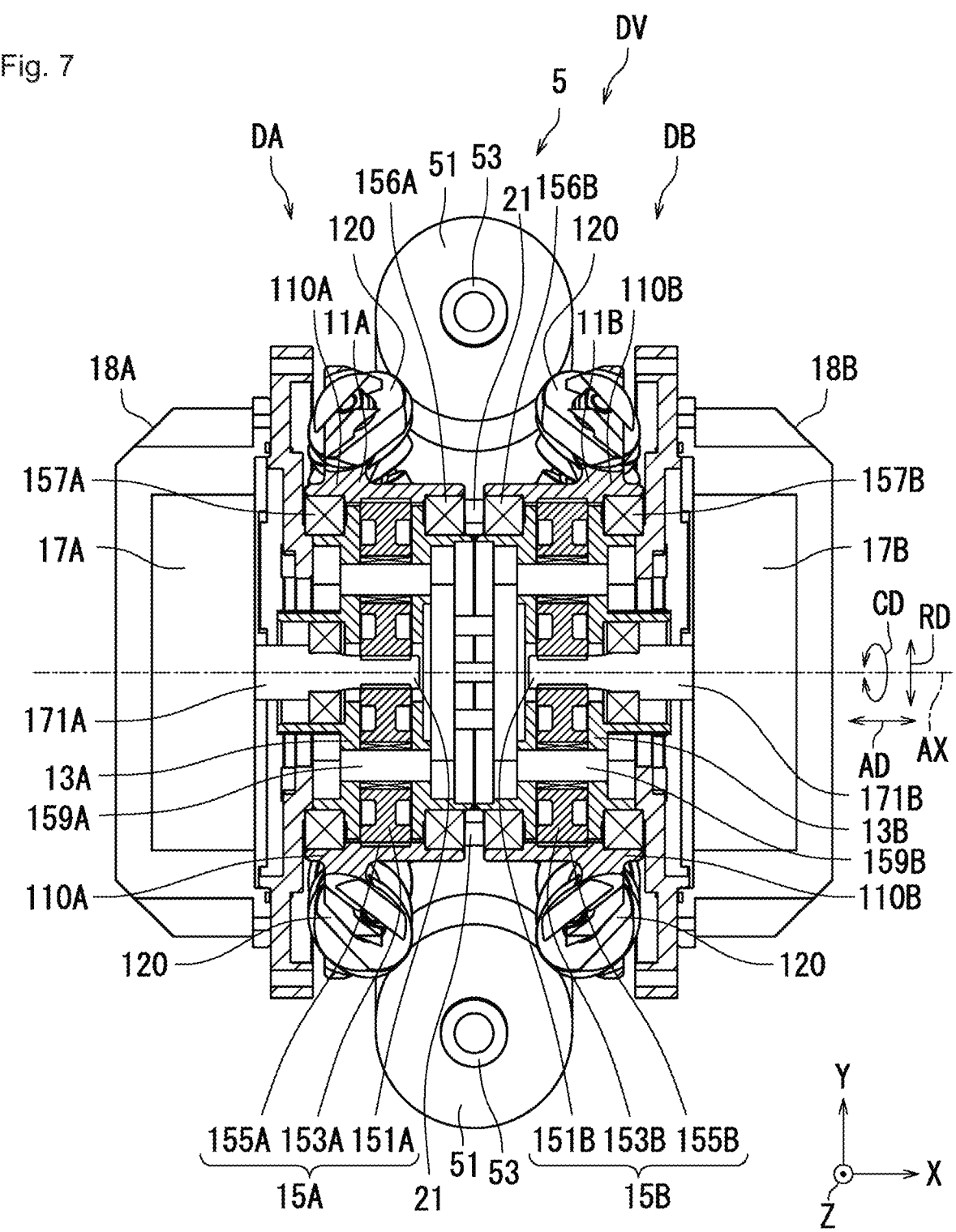
FIG. 7 is a cross-sectional view of the rotary drive device taken along a line VII-II of FIG. 4.

The rotary drive device DV will be further described with reference to FIG. 7. FIG. 7 is a cross-sectional view of the rotary drive device DV taken along the line VII-II of FIG. 4.

As shown in FIG. 7, the rotary drive device DV has the pair of drive force transmissions (drive force transmission 110A and drive force transmission 110B), a pair of deceleration assemblies 15 (first deceleration assembly 15A and second deceleration assembly 15B), the pair of carriers 13 (first carrier 13A and second carrier 13B), and at least one coupler (coupler 14A and coupler 14B).

The first drive assembly DA has the first drive force transmission device 11A, the first carrier 13A, the first deceleration assembly 15A, the first motor 17A, and the first motor case 18A. The first motor 17A is accommodated in the first motor case 18A.

The second drive assembly DB has the second drive force transmission device 11B, the second carrier 13B, the second deceleration assembly 15B, the second motor 17B, and the second motor case 18B. The second motor 17B is accommodated in the second motor case 18B. Since the second drive assembly DB has the same configuration as that of the first drive assembly DA, the description thereof will be omitted as appropriate.

The first motor 17A has the first rotary shaft 171A. The second motor 17B has the second rotary shaft 171B. The first rotary shaft 171A and the second rotary shaft 171B are examples of "input shafts".

The first deceleration assembly 15A has a first sun gear 151A, a plurality of first planetary gears 153A, and a first internal gear 155A. Specifically, the first deceleration assembly 15A has two first planetary gears 153A. Note that the first deceleration assembly 15A may have three or more first planetary gears 153A.

Similarly, the second deceleration assembly 15B has a second sun gear 151B, a plurality of second planetary gears 153B, and a second internal gear 155B. Specifically, the second deceleration assembly 15B has two second planetary gears 153B. Note that the second deceleration assembly 15B may have three or more second planetary gears 153B. Hereinafter, the "first sun gear 151A" and the "second sun gear 151B" may be collectively described simply as a "sun gear 151". Hereinafter, the "first planetary gear 153A" and the "second planetary gear 153B" may be collectively described simply as a "planetary gear 153". Hereinafter, the "first internal gear 155A" and the "second internal gear 155B" may be collectively described simply as an "internal gear 155".

The deceleration assembly 15 transmits power by rotating the sun gear 151 and the plurality of planetary gears 153 in contact with each other. That is, the deceleration assembly 15 is a so-called planetary gear type decelerator. More specifically, the deceleration assembly 15 is a star type planetary gear type decelerator. Specifically, external teeth of each of the plurality of planetary gears 153 mesh with internal teeth of the internal gear 155. The internal gear 155 constitutes a part of the drive force transmission 110. Therefore, when the plurality of planetary gears 153 rotate, the drive force transmission 110 rotates.

The deceleration assembly 15 converts a rotation motion of a rotation number N1 into a rotation motion of a rotation number N2 lower than the rotation number N1. The rotation number N1 and the rotation number N2 indicate the rotation speed of the rotation motion per unit time. In the present example embodiment, the deceleration assembly 15 decelerates the rotation speed of a rotary shaft 171 and rotates the drive force transmission at the decelerated rotation speed.

The pair of carriers 13 accommodate at least part of the deceleration assembly 15. Specifically, the first carrier 13A accommodates at least part of the first deceleration assembly 15A. In the present example embodiment, the first carrier 13A accommodates part of the first rotary shaft 171A, the first sun gear 151A, and the plurality of first planetary gears 153A. Similarly, the second carrier 13B accommodates part of the second rotary shaft 171B, the second sun gear 151B, and the plurality of second planetary gears 153B. The pair of carriers 13 face each other in the axial direction AD. Specifically, the first carrier 13A and the second carrier 13B face each other in the axial direction AD.

The first rotary shaft 171A is an input shaft of the first deceleration assembly 15A. The first rotary shaft 171A is arranged on the rotation axis AX and extends along the axial direction AD. The first rotary shaft 171A is substantially columnar. The "columnar" is, for example, "cylindrical". The first rotary shaft 171A is connected to the first motor 17A, which is a drive source. When the first motor 17A is driven, the first rotary shaft 171A rotates about the rotation axis AX at the rotation number N1.

The sun gear 151 is arranged inside the radial direction RD of the drive force transmission 110. The sun gear 151 rotates about the rotation axis AX. The sun gear 151 is substantially cylindrical. The sun gear 151 extends along the axial direction AD. The sun gear 151 is coupled to the first rotary shaft 171A in the axial direction AD. Therefore, when the first rotary shaft 171A rotates at the rotation number N1, the sun gear 151 rotates at the rotation number N1. In the present example embodiment, the rotary shaft 171 and the sun gear 151 are a single member. Note that the first rotary shaft 171A and the sun gear 151 may be separate members.

The plurality of planetary gears 153 are arranged along the Y-axis direction around the sun gear 151. That is, in the present example embodiment, the plurality of planetary gears 153 are arranged along the horizontal direction around the sun gear 151. In the present example embodiment, the plurality of planetary gears 153 are arranged at equal intervals along the circumferential direction CD around the sun gear 151. The external teeth of each of the plurality of planetary gears 153 mesh with the external teeth of the sun gear 151. Therefore, when the sun gear 151 rotates, each of the plurality of planetary gears 153 rotates.

The plurality of planetary gears 153 are arranged inside the radial direction RD of the drive force transmission 110. The external teeth of each of the plurality of planetary gears 153 come into contact with the internal gear 155. The internal gear 155 constitutes a part of the drive force transmission 110. Therefore, when the plurality of planetary gears 153 rotate, the drive force transmission 110 rotates.

The first carrier 13A supports the plurality of first planetary gears 153A so as to spin.

Specifically, the first carrier 13A has a plurality of carrier pins 159A. In the present example embodiment, the first carrier 13A has two carrier pins 150B.

The plurality of carrier pins 159A are arranged at equal intervals along the circumferential direction CD around the first sun gear 151A. The carrier pin 159A is substantially columnar. The "columnar" is, for example, "cylindrical". Each of the carrier pins 159A is fixed to the first carrier 13A.

Each of the plurality of carrier pins 159A penetrates the first planetary gear 153A in the axial direction AD and rotatably supports the first planetary gear 153A.

Figure 8:
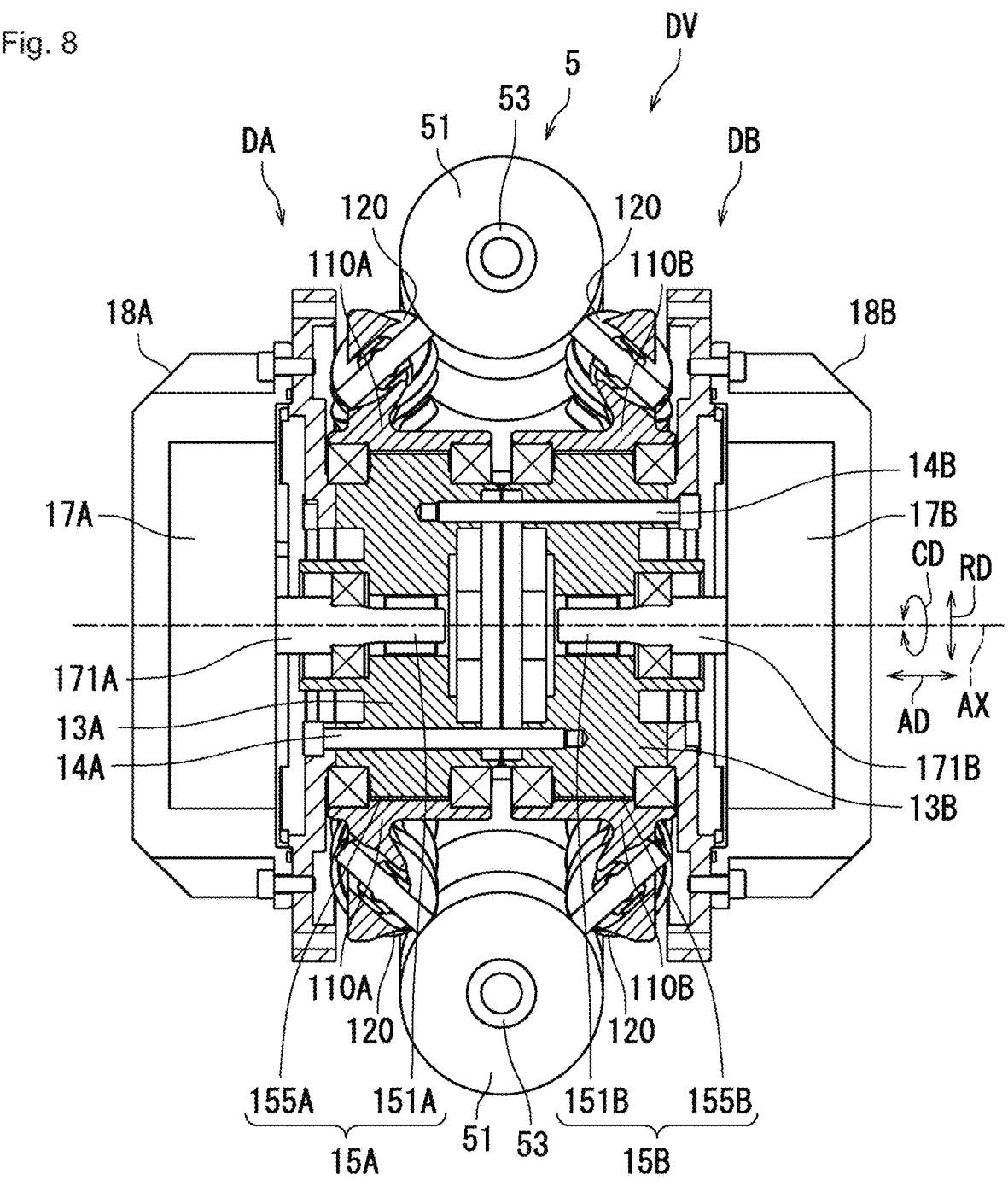
FIG. 8 is a cross-sectional view of the rotary drive device taken along a line VIII-III of FIG. 4.

Next, the coupling between the first carrier 13A and the second carrier will be described with reference to FIG. 8. FIG. 8 is a cross-sectional view of the rotary drive device DV taken along a line VIII-III of FIG. 4.

As shown in FIG. 8, the first carrier 13A and the second carrier 13B are directly coupled by at least one coupler (coupler 14A and coupler 14B). Specifically, one end of the coupler 14A is positioned in the first carrier 13A. On the other hand, one end of the coupler 14B is positioned in the second carrier 13B. Similarly, one end of the coupler 14B is positioned in the first carrier 13A. On the other hand, one end of the coupler 14B is positioned in the second carrier 13B. Therefore, the first carrier 13A and the second carrier 13B are coupled via the coupler 14A and the coupler 14B. As a result, it is possible to easily couple the pair of carriers (first carrier 13A and second carrier 13B).

Figure 9A:
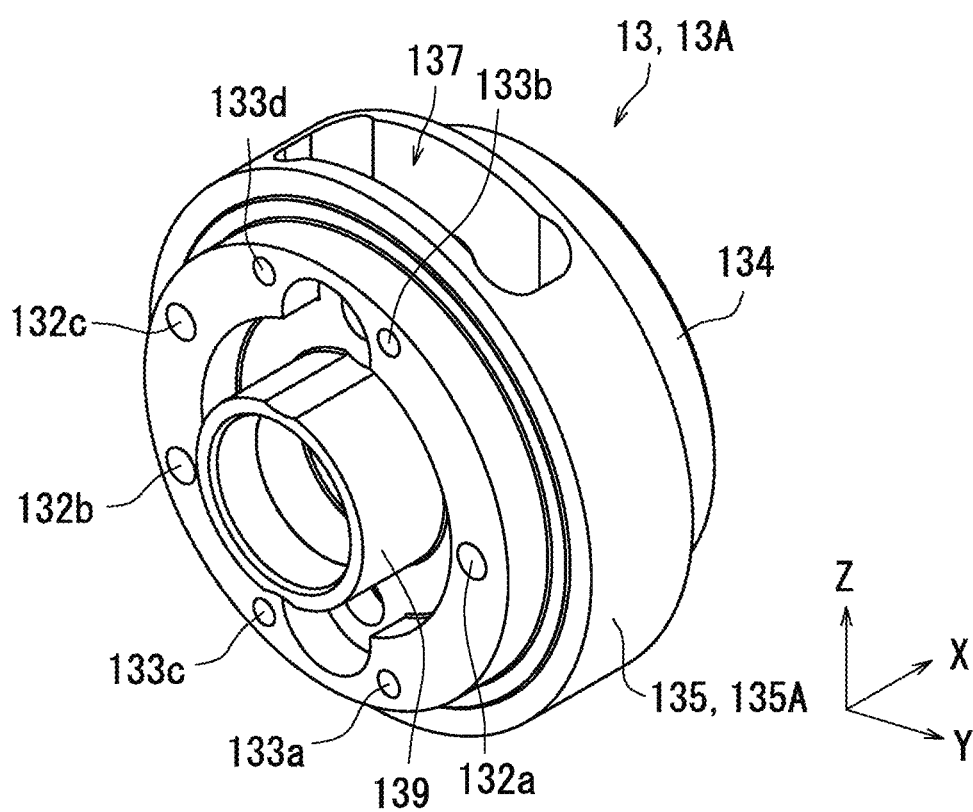
FIG. 9A is a perspective view showing a carrier according to an example embodiment of the present disclosure.
Figure 9B:
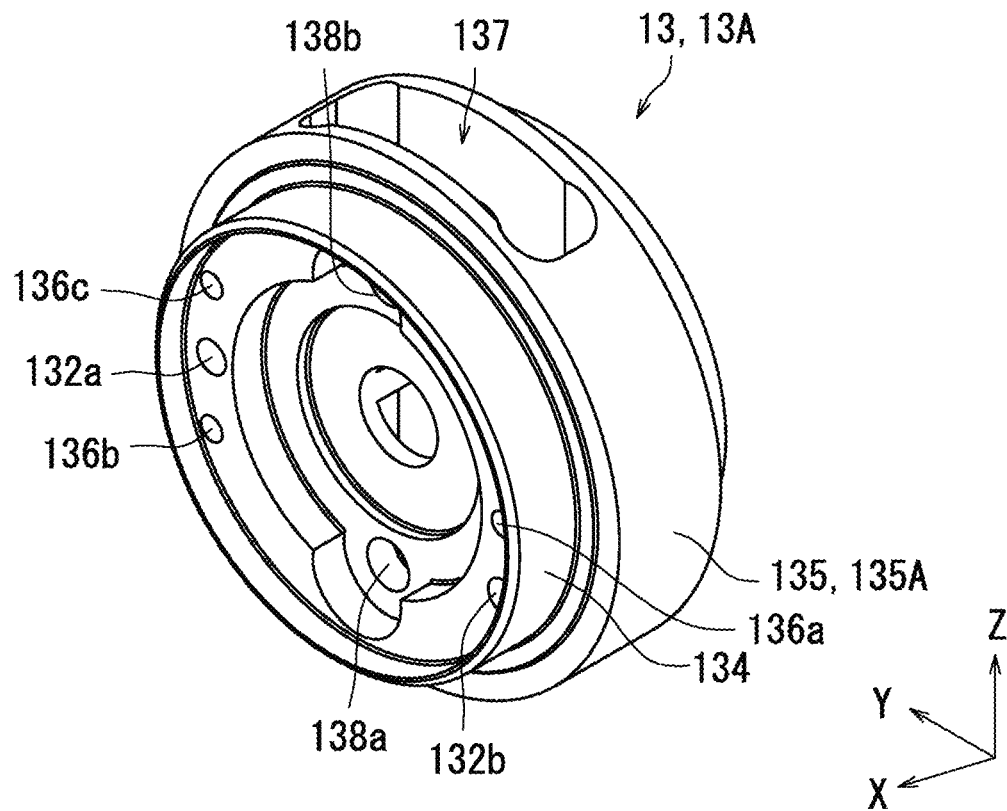
FIG. 9B is a perspective view showing a carrier according to an example embodiment of the present disclosure.
Figure 10A:
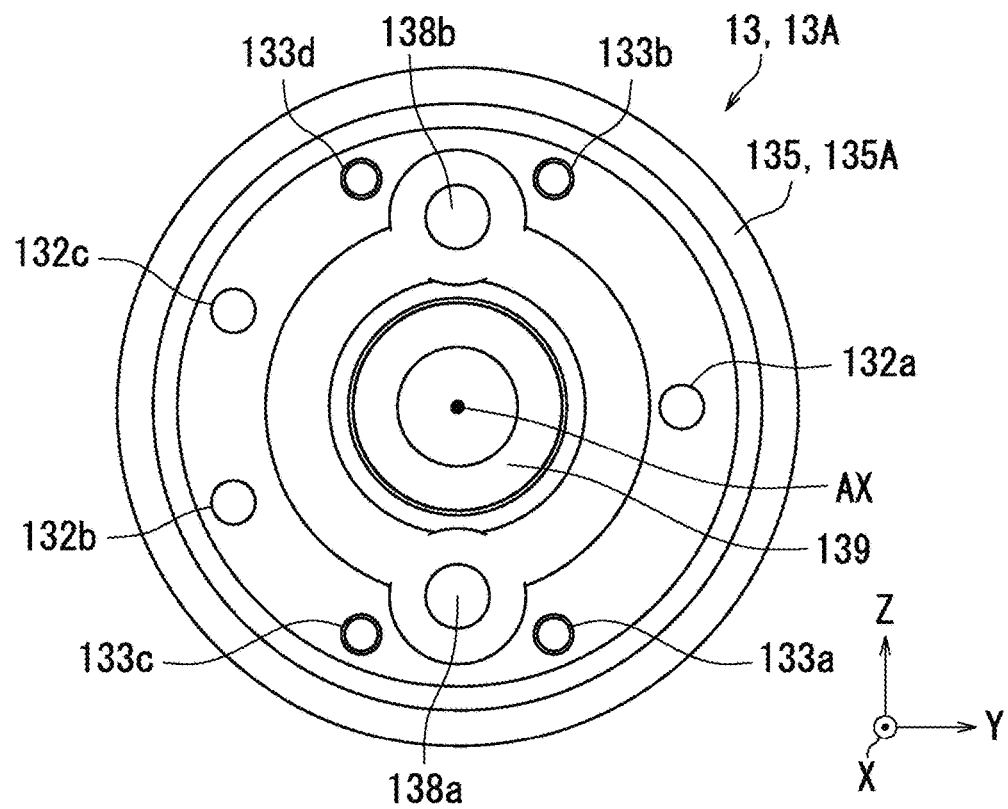
FIG. 10A is a side view showing a carrier according to an example embodiment of the present disclosure.
Figure 10B:
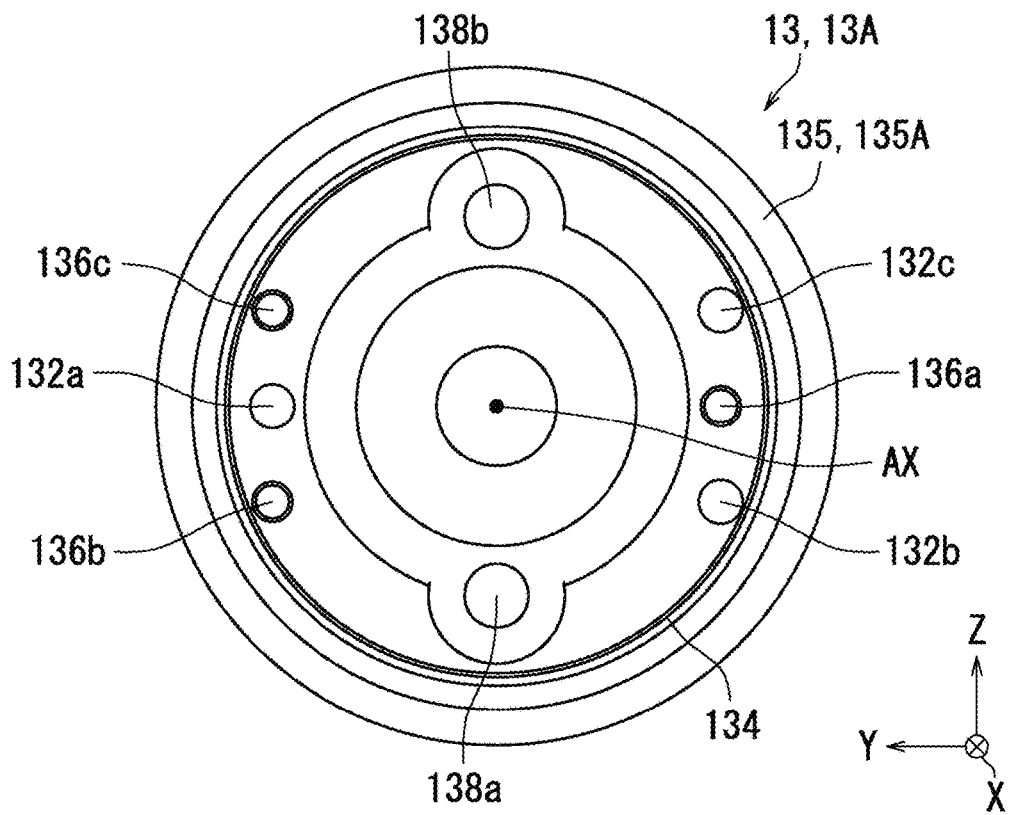
FIG. 10B is a side view showing a carrier according to an example embodiment of the present disclosure.
Figure 11:
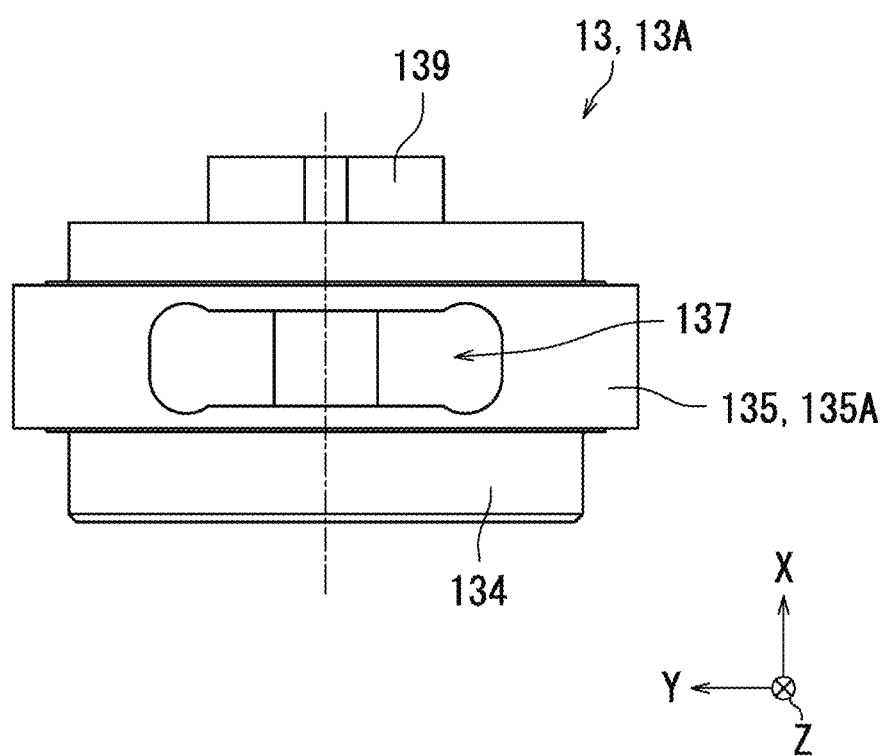
FIG. 11 is a front view showing a carrier according to an example embodiment of the present disclosure.

The carrier 13 will be further described with reference to FIGS. 9A to 11. FIGS. 9A and 9B are perspective views showing the carrier 13. FIGS. 10A and 10B are side views showing the carrier 13. FIG. 11 is a front view showing the carrier 13. Since the first carrier 13A and the second carrier 13B have the same configuration, the description thereof will be omitted as appropriate.

As shown in FIGS. 9A and 9B, the first carrier 13A has a first body portion 135A, a first protrusion portion 134A, and a shaft insertion portion 139. The first body portion 135A has a substantially cylindrical shape. The first protrusion portion 134A protrudes from the first body portion 135A to the second carrier 13B side. The first rotary shaft 171A (FIGS. 7 and 8) of the first motor 17A is inserted into the shaft insertion portion 139.

Similarly, the second carrier 13B has a second body portion 135B, a second protrusion portion 134B, and the shaft insertion portion 139. The second body portion 135B has a substantially cylindrical shape. The second protrusion portion 134B protrudes from the second body portion 135B to the first carrier 13A side. The second rotary shaft 171B (FIGS. 7 and 8) of the second motor 17B is inserted into the shaft insertion portion 139.

As shown in FIGS. 9A to 10B, the first carrier 13A is formed with a plurality of through holes (through hole 132a, through hole 132b, and through hole 132c) and a plurality of screw holes (screw hole 136a, screw hole 136b, and screw hole 136c).

In the present example embodiment, the first carrier 13A is formed with three through holes. In the present description, the through hole 132a, the through hole 132b, and the through hole 132c may be collectively referred to as a through hole 132. The through hole 132 penetrates the first body portion 135A. The coupler 14A can be inserted into the through hole 132.

In the present example embodiment, the first carrier 13A is formed with three screw holes. Specifically, the screw hole 136a, the screw hole 136b, and the screw hole 136c are formed in the first body portion 135A. In the present description, the screw hole 136a, the screw hole 136b, and the screw hole 136c may be collectively referred to as a screw hole 136. The screw hole 136 is formed on the side opposite to the side where the shaft insertion portion 139 is positioned. That is, the screw hole 136 is formed on the side facing the second carrier 13B. The coupler 14 can be screwed into the screw hole 136.

Similarly, the second carrier 13B is formed with the plurality of through holes (through hole 132a, through hole 132b, and through hole 132c) and the plurality of screw holes (screw hole 136a, screw hole 136b, and screw hole 136c).

In the present example embodiment, the second carrier 13B is formed with three through holes. In the present description, the through hole 132a, the through hole 132b, and the through hole 132c may be collectively referred to as a through hole 132. The through hole 132 penetrates the second body portion 135B. The coupler 14B can be inserted into the through hole 132.

In the present example embodiment, the second carrier 13B is formed with three screw holes. Specifically, the screw hole 136a, the screw hole 136b, and the screw hole 136c are formed in the second body portion 135B. In the present description, the screw hole 136a, the screw hole 136b, and the screw hole 136c may be collectively referred to as a screw hole 136. The screw hole 136 is formed on the side opposite to the side where the shaft insertion portion 139 is positioned. That is, the screw hole 136 is formed on the side facing the second carrier 13B. The coupler 14 can be screwed into the screw hole 136.

When viewed from the axial direction AD in the first carrier 13A, at least one through hole 132 is arranged at a position point-symmetric about at least one screw hole 136 and the rotation axis AX. In the present example embodiment, when viewed from the axial direction AD in the first carrier 13A, the through hole 132a, the through hole 132b, and the through hole 132c are arranged at positions point-symmetric about the screw hole 136a, the screw hole 136b, the screw hole 136c, and the rotation axis AX. Therefore, by rotating the carriers to face each other, it is possible to share the members of the first carrier and the second carrier.

Similarly, when viewed from the axial direction AD in the second carrier 13B, at least one through hole 132 is arranged at a position point-symmetric about at least one screw hole 136 and the rotation axis AX. In the present example embodiment, when viewed from the axial direction AD in the second carrier 13B, the through hole 132a, the through hole 132b, and the through hole 132c are arranged at positions point-symmetric about the screw hole 136b and the rotation axis AX. Therefore, by rotating the carriers to face each other, it is possible to share the members of the first carrier and the second carrier.

The first body portion 135A is further formed with fixing holes 133a to 133d, an opening 137, a fixing hole 138a, and a fixing hole 138b.

A fixing member can be inserted into the fixing holes 133a to 133d. The fixing member is, for example, a screw. The first motor case 18A and the first carrier 13A are fixed by inserting the fixing member into the fixing holes 133a to 133d.

The opening 137 is an opening for inserting the first planetary gear 153A. Part of the first planetary gear 153A is exposed from the opening 137 in a state where the first planetary gear 153A is attached to the first carrier 13A.

A fixing member can be inserted into the fixing holes 133a to 133d. The fixing member is, for example, a screw. The first motor case 18A and the first carrier 13A are fixed by inserting the fixing member into the fixing holes 133a to 133d.

Similarly, the second body portion 135B is further formed with the fixing holes 133a to 133d, the opening 137, the fixing hole 138a, and the fixing hole 138b.

Figure 12:
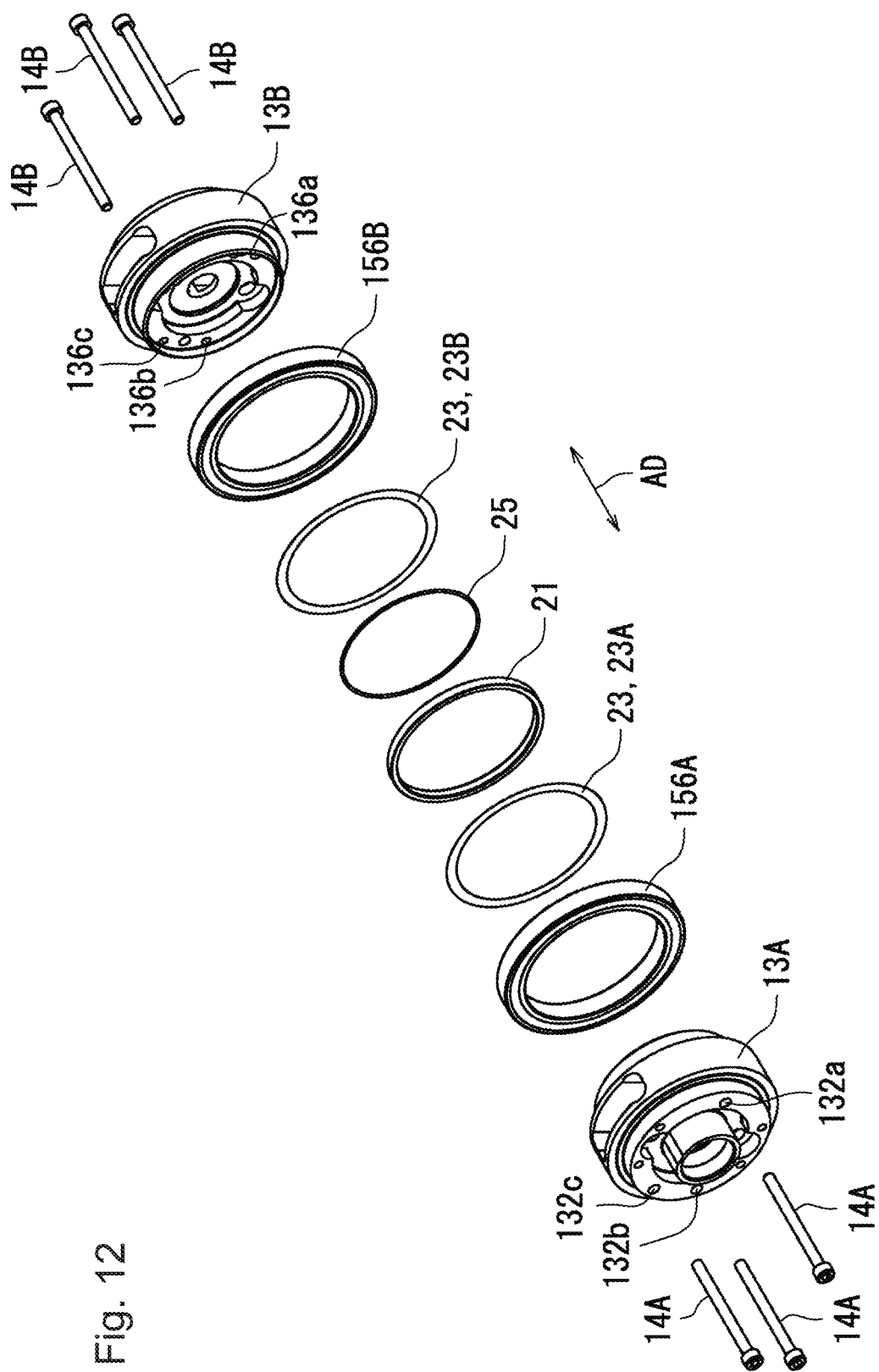
FIG. 12 shows an exploded perspective view in a vicinity of a first carrier and a second carrier of a rotary drive device according to an example embodiment of the present disclosure.

The rotary drive device DV will be further described with reference to FIG. 12. FIG. 12 shows an exploded perspective view in the vicinity of the first carrier 13A and the second carrier 13B of the rotary drive device DV. FIG. 12 shows the first carrier 13A, the second carrier 13B, the coupler 14A, the coupler 14B, a centering support 21, a first adjuster 23A, a second adjuster 23B, a seal 25, a first bearing 156A, and a second bearing 156B.

As shown in FIG. 12, the rotary drive device DV further has the centering support 21, the first adjuster 23A, the second adjuster 23B, the seal 25, the first bearing 156A, and the second bearing 156B. The first adjuster 23A, the second adjuster 23B, and the seal 25 will be described later with reference to FIGS. 13A to 19.

The through holes 132a to 132c of the first carrier 13A and the screw holes 136a to 136c of the second carrier 13B are positioned at positions facing each other in the axial direction AD. Therefore, it is possible to easily couple the pair of carriers by inserting the coupler 14A into the through holes 132a to 132c of the first carrier 13A and screwing the coupler 14A into the screw holes 136a to 136c.

Similarly, the through holes 132a to 132c of the second carrier 13B and the screw holes 136a to 136c of the second carrier 13B are positioned at positions facing each other in the axial direction AD. Therefore, it is possible to easily couple the pair of carriers by inserting the coupler 14B into the through holes 132a to 132c of the second carrier 13B and screwing the coupler 14B into the screw holes 136a to 136c. Note that the through holes 132a to 132c of the second carrier 13B and the screw holes 136a to 136c of the second carrier 13B are hidden and not visible in FIG. 12.

Figure 13A:
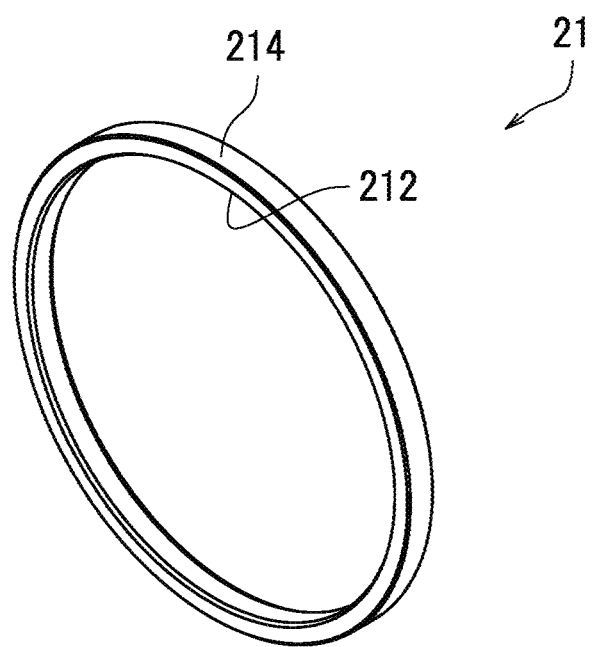
FIG. 13A is a perspective view showing a centering support according to an example embodiment of the present disclosure.
Figure 13B:
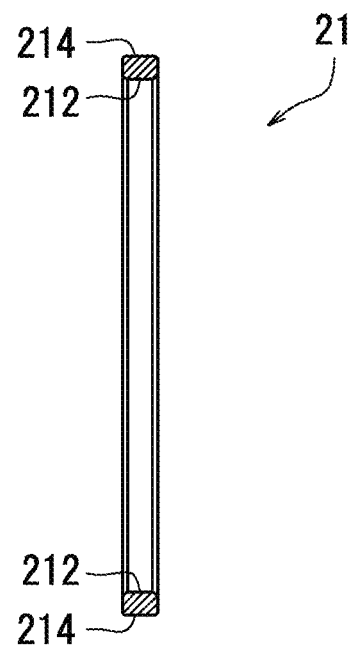
FIG. 13B is a cross-sectional view showing a centering support according to an example embodiment of the present disclosure.
Figure 14A:
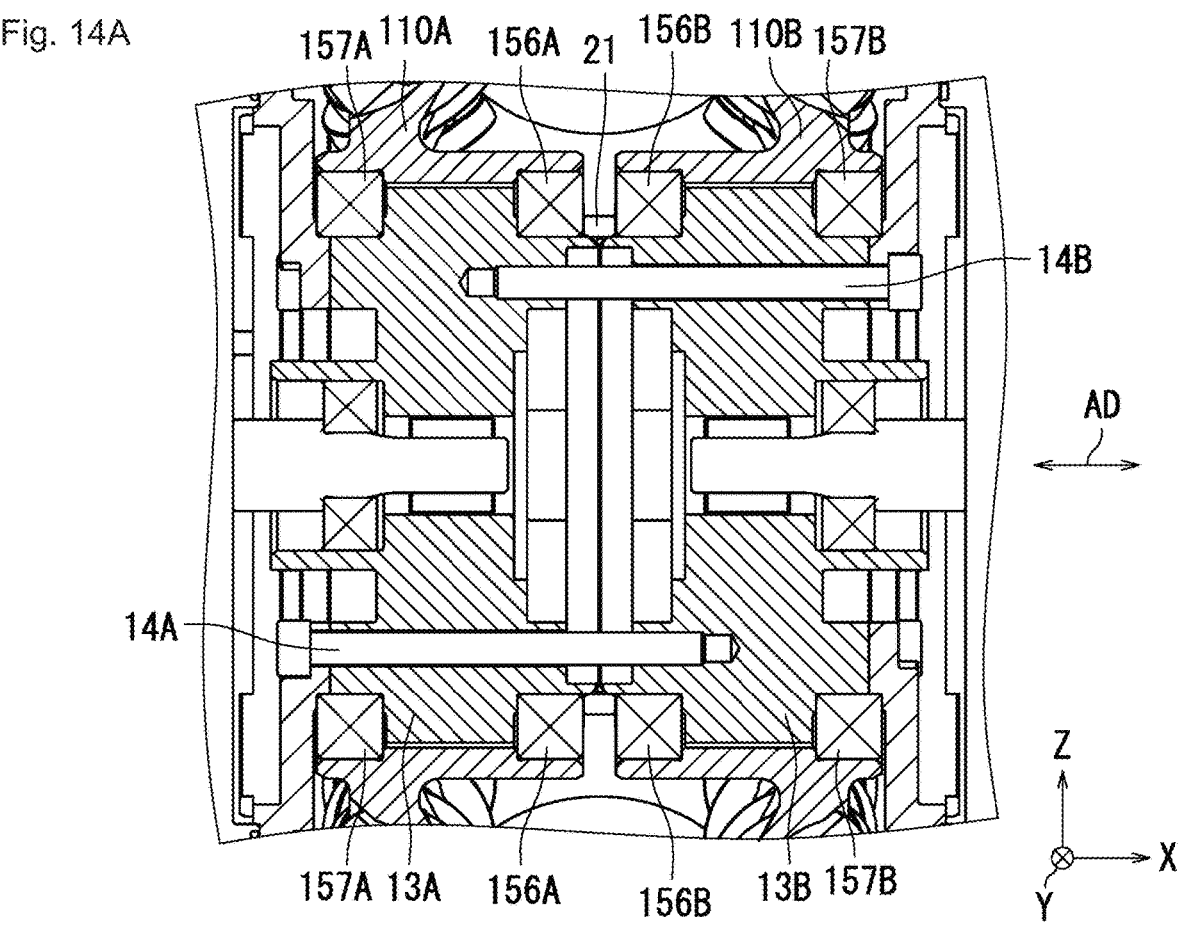
FIG. 14A is a cross-sectional view in a vicinity of a centering support according to an example embodiment of the present disclosure.
Figure 14B:
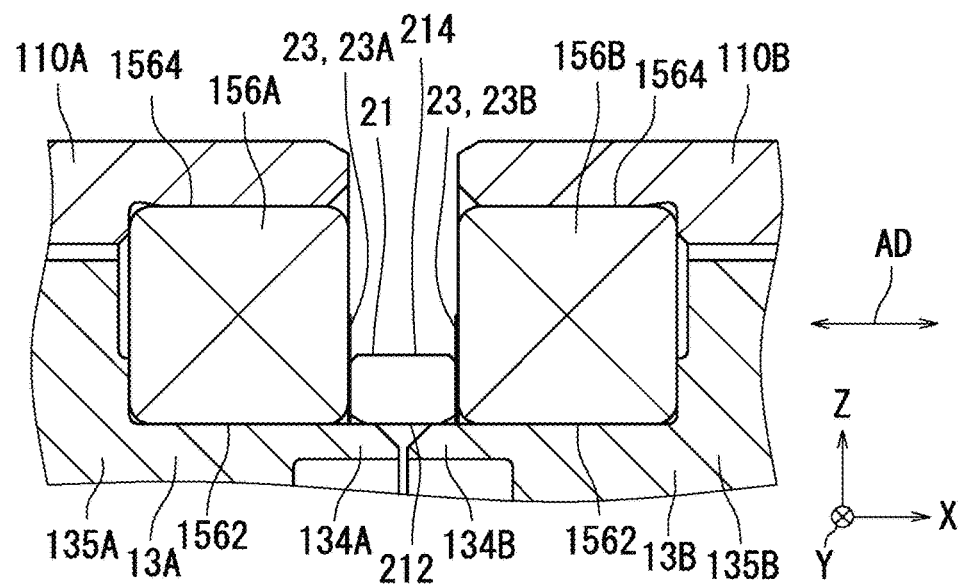
FIG. 14B is a cross-sectional view in a vicinity of a centering support according to an example embodiment of the present disclosure.

Next, the centering support 21 will be described with reference to FIGS. 13A to 14B. FIG. 13A is a perspective view showing the centering support 21. FIG. 13B is a cross-sectional view showing the centering support 21. FIGS. 14A and 14B are cross-sectional views in the vicinity of the centering support 21.

As shown in FIGS. 13A and 13B, the centering support 21 is annular. In the present example embodiment, the centering support 21 is circular. The centering support 21 has an inner circumferential surface 212 and an outer circumferential surface 214. The centering support 21 is made of, for example, metal.

As shown in FIGS. 14A and 14B, the rotary drive device DV further has the centering support 21. The centering support 21 makes the shaft cores of the pair of carriers 13 coaxial. Specifically, the centering support 21 aligns the shaft core of the first carrier 13A and the shaft core of the second carrier 13B in a straight line. Therefore, it is possible to make the shaft cores of the pair of carriers coaxial with high accuracy.

As shown in FIG. 14B, the first protrusion portion 134A and the second protrusion portion 134B face each other. The inner circumferential surface 212 of the centering support 21 comes into contact with the first protrusion portion 134A and the second protrusion portion 134B. Therefore, it is possible to make the shaft cores of the first carrier 13A and the second carrier 13B coaxial with a common member. As a result, it is possible to make the shaft cores of the pair of carriers 13 coaxial with high accuracy.

The first bearing 156A is attached to the first carrier 13A and rotatably supports the first drive force transmission 110A. The first bearing 156A has an inner circumferential portion 1562 and an outer circumferential portion 1564. The second bearing 156B is attached to the second carrier 13B and rotatably supports the second drive force transmission 110B. The second bearing 156B has the inner circumferential portion 1562 and the outer circumferential portion 1564.

The centering support 21 is held between the first bearing 156A and the second bearing 156B in the axial direction AD. Therefore, it is possible to increase the distance between the first bearing 156A and the second bearing 156B.

The rotary drive device DV further has a pair of adjusters 23. The pair of adjusters 23 has the first adjuster 23A and the second adjuster 23B. The adjuster 23 is present between at least one of the first bearing 156A and the second bearing 156B and the centering support 21. Specifically, the first adjuster 23A is present between the first bearing 156A and the centering support 21. The second adjuster 23B is present between the second bearing 156B and the centering support 21. Note that the rotary drive device DV may have only one adjuster 23. In this case, the adjuster 23 is present either between the first bearing 156A and the centering support 21, or between the second bearing 156B and the centering support 21. The centering support 21 is held between the first bearing 156A and the second bearing 156B via the adjuster 23, and therefore the preload applied to the main wheel 5 can be easily adjusted.

Figure 15A:
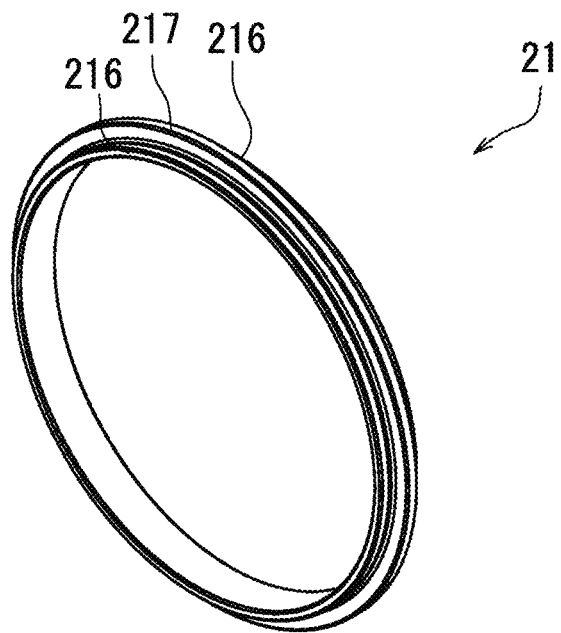
FIG. 15A is a perspective view showing a centering support according to an example embodiment of the present disclosure.
Figure 15B:
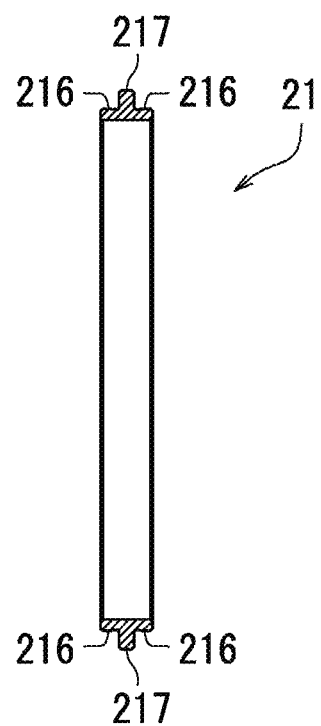
FIG. 15B is a cross-sectional view showing a centering support according to an example embodiment of the present disclosure.
Figure 16A:
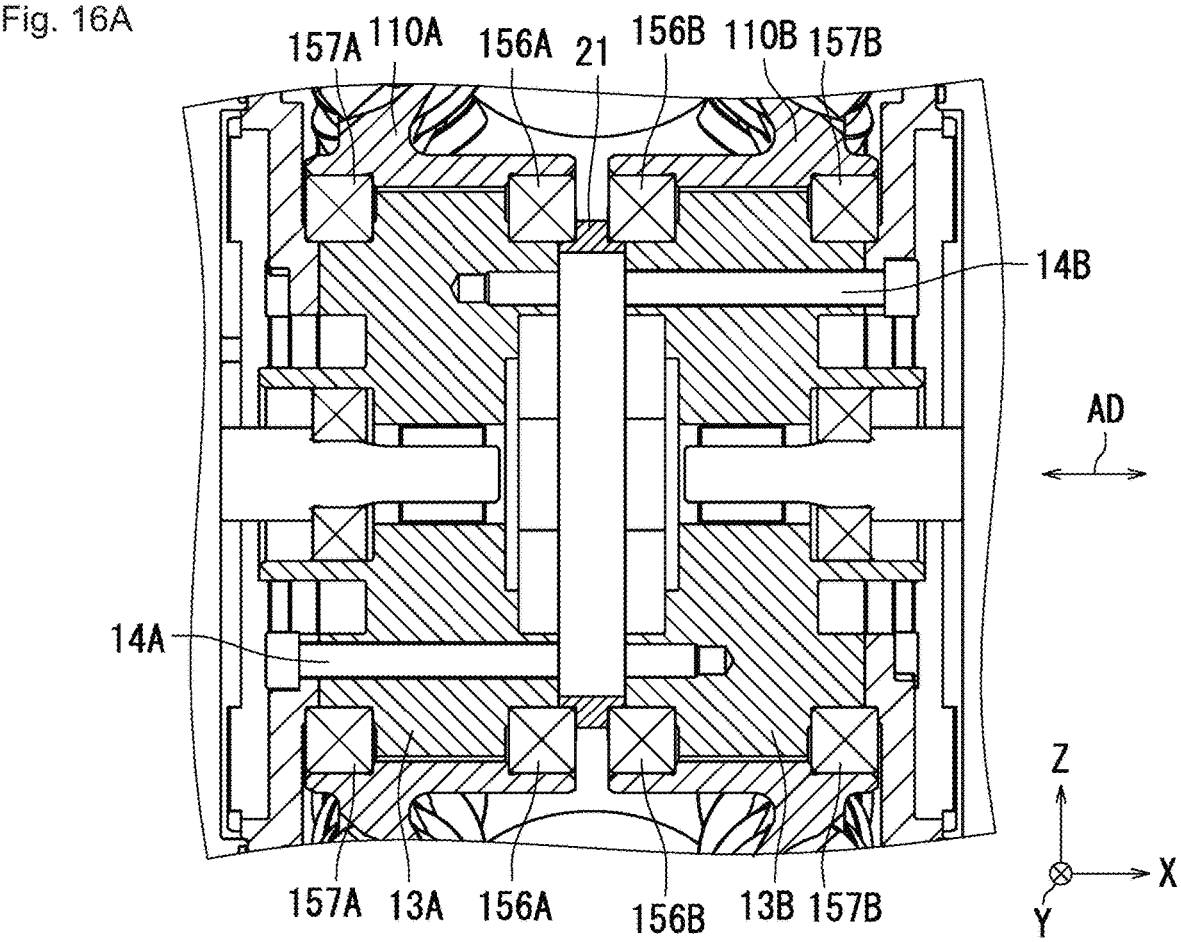
FIG. 16A is a cross-sectional view in a vicinity of a centering support according to an example embodiment of the present disclosure.
Figure 16B:
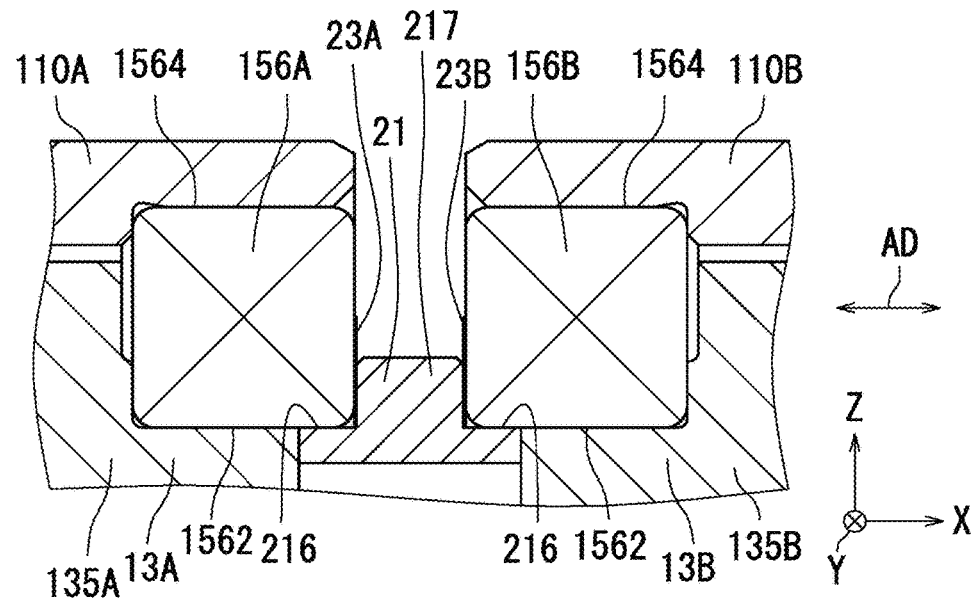
FIG. 16B is a cross-sectional view in a vicinity of a centering support according to an example embodiment of the present disclosure.

Next, a variation of the centering support 21 will be described with reference to FIGS. 15A to 16B. FIG. 15A is a perspective view showing the centering support 21. FIG. 15B is a cross-sectional view showing the centering support 21. FIGS. 16A and 16B are cross-sectional views in the vicinity of the centering support 21.

As shown in FIGS. 15A and 15B, the centering support 21 is annular. In the present variation, the centering support 21 is substantially circular. The centering support 21 has a flat portion 216 and a projection portion 217. The flat portion 216 is flat. The projection 217 projects from the flat portion 216.

As shown in FIGS. 16A and 16B, the centering support 21 comes into contact with the inner circumferential portion 1562 of the first bearing 156A and the inner circumferential portion 1562 of the second bearing 156B. Therefore, it is possible to make the shaft cores of the pair of carriers coaxial with high accuracy.

Figure 17A:
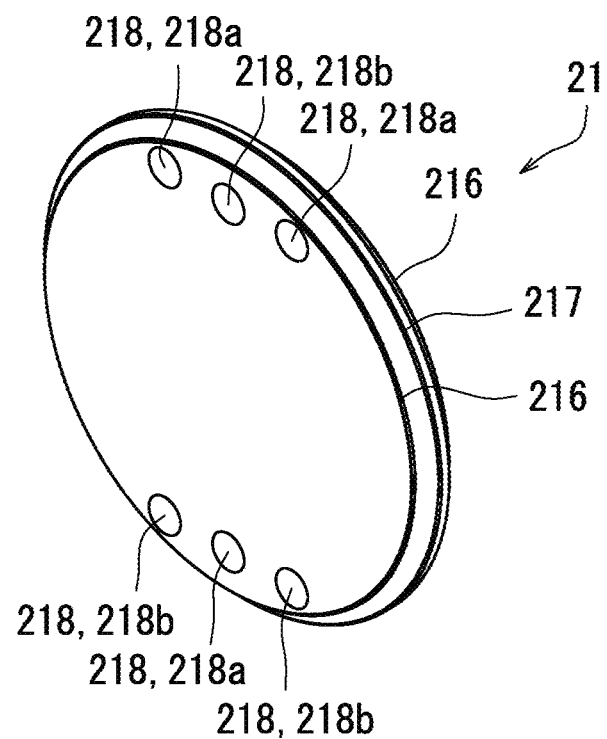
FIG. 17A is a perspective view showing a centering support according to an example embodiment of the present disclosure.
Figure 17B:
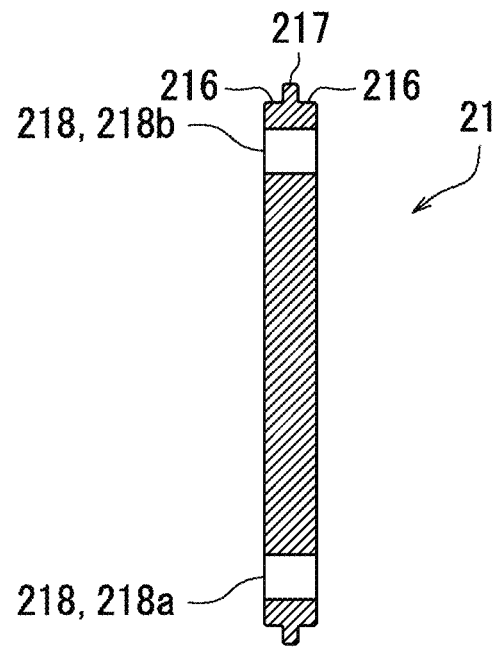
FIG. 17B is a cross-sectional view showing a centering support according to an example embodiment of the present disclosure.
Figure 18A:
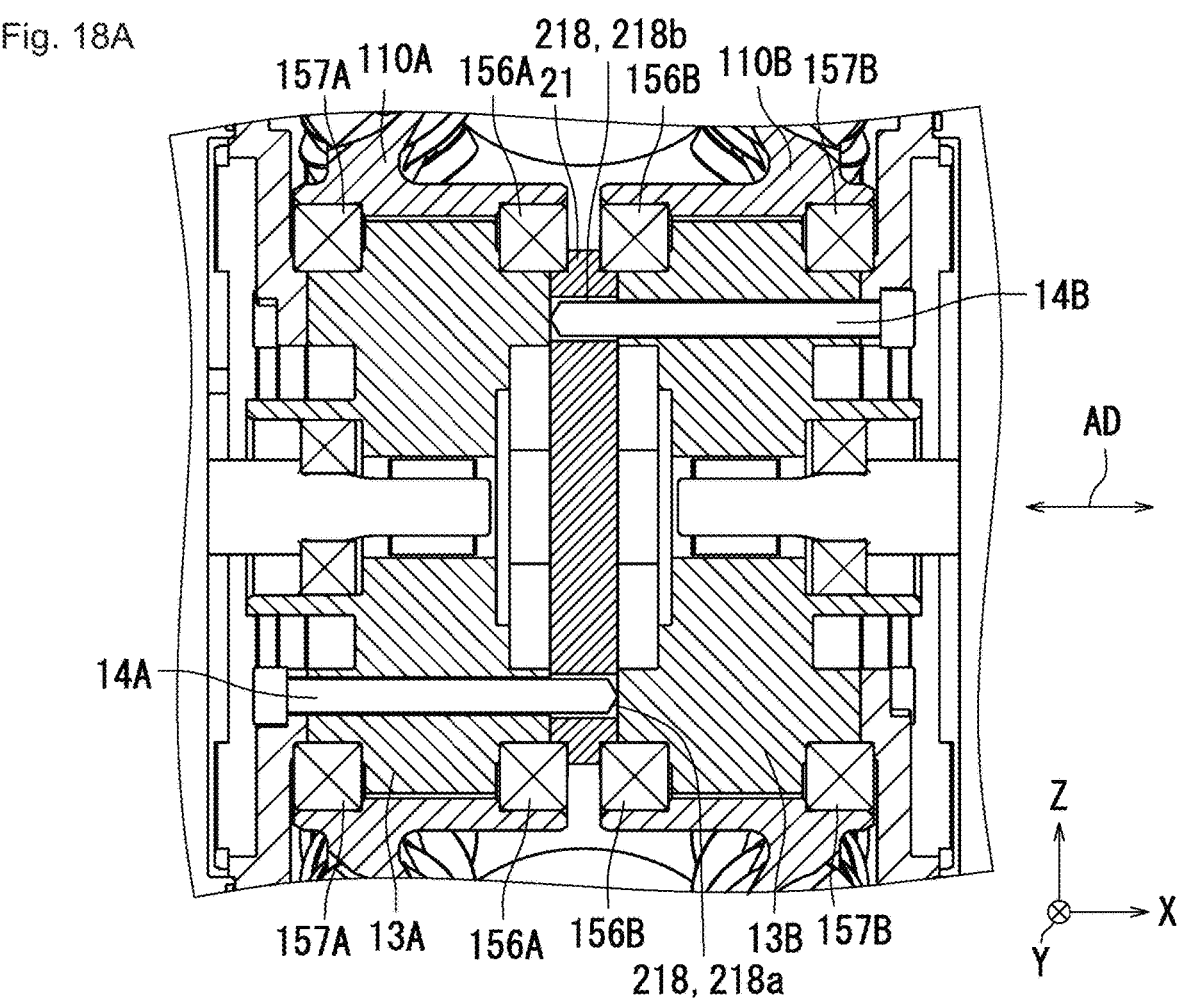
FIG. 18A is a cross-sectional view in a vicinity of a centering support according to an example embodiment of the present disclosure.
Figure 18B:
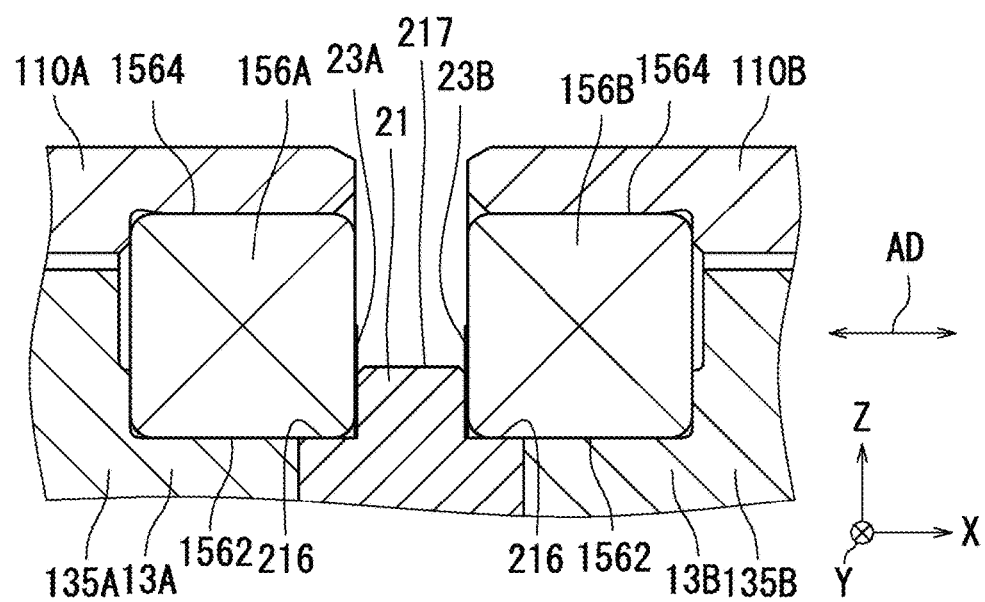
FIG. 18B is a cross-sectional view in a vicinity of a centering support according to an example embodiment of the present disclosure.

Next, another variation of the centering support 21 will be described with reference to FIGS. 17A to 18B. FIG. 17A is a perspective view showing the centering support 21. FIG. 17B is a cross-sectional view showing the centering support 21. FIGS. 18A and 18B are cross-sectional views in the vicinity of the centering support 21.

As shown in FIGS. 17A and 17B, the centering support 21 is substantially disk-like. The centering support 21 has a flat portion 216 and a projection portion 217. It has the flat portion 216 and the projection portion 217. The flat portion 216 is flat. The projection 217 projects from the flat portion 216. A plurality of screw holes 218 are formed in the centering support 21. In the present variation, the centering support 21 is formed with three screw holes 218a and three screw holes 218b.

As shown in FIG. 18A, the first carrier 13A is coupled with the centering support 21 by at least one coupler 14A. Specifically, the first carrier 13A is coupled with the centering support 21 by screwing the coupler 14A into the centering support 21. In the present variation, the first carrier 13A is coupled with the centering support 21 by three couplers 14A. The second carrier 13B is coupled with the centering support 21 by at least one coupler 14B. Specifically, the second carrier 13B is coupled with the centering support 21 by screwing the coupler 14B into the centering support 21. In the present variation, the second carrier 13B is coupled with the centering support 21 by three couplers 14B.

In the present variation, the first carrier 13A and the second carrier 13B are indirectly coupled by at least one coupler 14. Specifically, the first carrier 13A is coupled with the centering support 21 by at least one coupler 14A. The second carrier 13B is coupled with the centering support 21 by at least one coupler 14B. Therefore, it is possible to easily and indirectly couple the pair of carriers 13.

Figure 19:
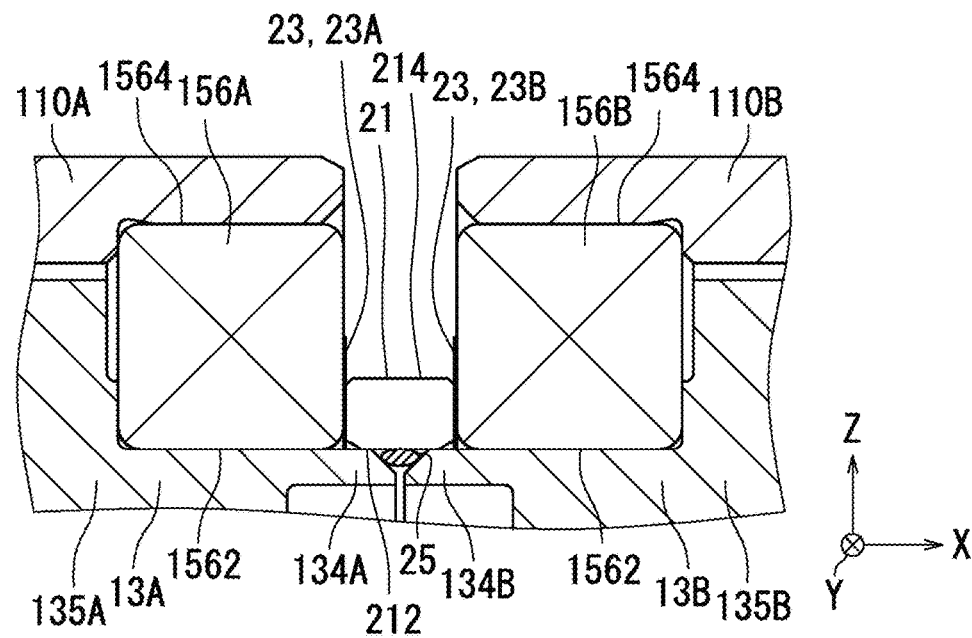
FIG. 19 is a cross-sectional view in a vicinity of a centering support according to an example embodiment of the present disclosure.

The seal 25 will be described with reference to FIG. 19. FIG. 19 is a cross-sectional view in the vicinity of the centering support 21.

As shown in FIG. 19, it is preferable that the rotary drive device DV further has the seal 25. The seal 25 is arranged in a space formed by the inner circumferential surface 212 of the centering support 21, the first protrusion portion 134A, and the second protrusion portion 134B. The seal 25 is, for example, an O-ring. The seal 25 is, for example, an elastic member such as rubber. The seal 25 comes into contact with the inner circumferential surface 212 of the centering support 21, the first protrusion portion 134A, and the second protrusion portion 134B. Therefore, it is possible to fill the gap generated among the inner circumferential surface 212 of the centering support 21, the first protrusion portion 134A, and the second protrusion portion 134B. As a result, the seal 25 can suppress rainwater from entering the inside of the rotary drive device from the outside of the rotary drive device. The seal can suppress oil from leaking from the inside of the rotary drive device.

The example embodiment of the present disclosure has been described above with reference to the drawings (FIGS. 1 to 19). However, the present disclosure is not limited to the above-described example embodiment, and the present disclosure can be implemented in various modes without departing from the scope thereof. The drawings mainly schematically show each component for the sake of easy understanding, and the thickness, length, number, and the like of each illustrated component are different from the actual ones for convenience of drawing creation. The material, shape, dimensions, and the like of each component shown in the above example embodiment are only examples and are not particularly limited, and various changes can be made without substantially departing from the configuration of the present disclosure.

The present disclosure can be used, for example, in a rotary drive device.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotary drive device, comprising:
a pair of drive force transmissions in which a plurality of driving rollers transmitting drive force to a main wheel including a plurality of driven rollers are provided, the drive force transmissions being rotatable about a rotation axis;
a pair of decelerators to decelerate a rotation speed of an input shaft and rotating the drive force transmission at a decelerated rotation speed;
a pair of carriers accommodating at least a portion of the decelerator and opposing each other in an axial direction along the rotation axis; and
at least one coupler; wherein
the pair of carriers include a first carrier and a second carrier;
the first carrier and the second carrier are directly coupled by the at least one coupler;
the first carrier includes a through hole into which the at least one coupler can be inserted;
the second carrier includes a screw hole into which the at least one coupler can be threaded;
the through hole and the screw hole are positioned at positions opposing each other in the axial direction; and
the at least one coupler includes a coupler which penetrates through portions of both the first carrier and the second carrier.

2. The rotary drive device according to claim 1; wherein
the at least one coupler includes multiple couplers;
the first carrier and the second carrier each include at least the one through hole and at least the one screw hole;
when viewed from the axial direction in the first carrier, the at least the one through hole is point-symmetric with respect to the at least the one screw hole about the rotation axis; and
when viewed from the axial direction in the second carrier, the at least the one through hole is point-symmetric with respect to the at least the one screw hole about the rotation axis.

3. The rotary drive device according to claim 1, further comprising a centering support making shaft cores of the pair of carriers coaxial.

4. The rotary drive device according to claim 3, further comprising:
a first bearing; and
a second bearing; wherein
the pair of drive force transmissions include a first drive force transmission and a second drive force transmission;
the first bearing is attached to the first carrier and rotatably supports the first drive force transmission;
the second bearing is attached to the second carrier and rotatably supports the second drive force transmission; and
the centering support is held between the first bearing and the second bearing in the axial direction.

5. The rotary drive device according to claim 4, further comprising an adjuster between at least one of the first bearing and the second bearing and the centering support.

6. The rotary drive device according to claim 4, wherein
the first bearing includes an inner circumferential portion and an outer circumferential portion;
the second bearing includes an inner circumferential portion and an outer circumferential portion; and
the centering support contacts the inner circumferential portion of the first bearing and the inner circumferential portion of the second bearing.

7. A rotary drive device, comprising:
a pair of drive force transmissions in which a plurality of driving rollers transmitting drive force to a main wheel including a plurality of driven rollers are provided, the drive force transmissions being rotatable about a rotation axis;
a pair of decelerators to decelerate a rotation speed of an input shaft and rotating the drive force transmission at a decelerated rotation speed;
a pair of carriers accommodating at least a portion of the decelerator and opposing each other in an axial direction along the rotation axis;
at least one coupler; and
a centering support making shaft cores of the pair of carriers coaxial; wherein
the pair of carriers include a first carrier and a second carrier;
the first carrier and the second carrier are directly or indirectly coupled by the at least one coupler;
the first carrier is coupled with the centering support by the at least one coupler; and
the second carrier is coupled with the centering support by the at least one coupler.

8. The rotary drive device according to claim 7, wherein
the centering support is annular;
the centering support includes an inner circumferential surface and an outer circumferential surface;
the first carrier includes:
a first body portion; and
a first protrusion portion protruding from the first body portion to the second carrier side;
the second carrier includes:
a second body portion; and
a second protrusion portion protruding from the second body portion to the first carrier side;
the first protrusion portion and the second protrusion portion oppose each other; and
the inner circumferential surface of the centering support contacts the first protrusion portion and the second protrusion portion.

9. The rotary drive device according to claim 8, further comprising a seal in a space defined by an inner circumferential surface of the centering support, the first protrusion portion, and the second protrusion portion.

10. The rotary drive device according to claim 7, further comprising:
a first bearing; and
a second bearing; wherein
the pair of drive force transmissions include a first drive force transmission and a second drive force transmission;
the first bearing is attached to the first carrier and rotatably supports the first drive force transmission;
the second bearing is attached to the second carrier and rotatably supports the second drive force transmission; and
the centering support is held between the first bearing and the second bearing in the axial direction.

11. The rotary drive device according to claim 10, further comprising an adjuster between at least one of the first bearing and the second bearing and the centering support.

12. The rotary drive device according to claim 10, wherein
- the first bearing includes an inner circumferential portion and an outer circumferential portion;
- the second bearing includes an inner circumferential portion and an outer circumferential portion; and
- the centering support contacts the inner circumferential portion of the first bearing and the inner circumferential portion of the second bearing.

* * * * *